US012462753B2

(12) United States Patent
Zhang

(10) Patent No.: US 12,462,753 B2
(45) Date of Patent: Nov. 4, 2025

(54) COMPOSITE DRIVING CIRCUIT AND DISPLAY PANEL

(71) Applicant: BOE Technology Group Co., Ltd., Beijing (CN)

(72) Inventor: Hao Zhang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/697,190

(22) PCT Filed: Jun. 30, 2022

(86) PCT No.: PCT/CN2022/102642
§ 371 (c)(1),
(2) Date: Mar. 29, 2024

(87) PCT Pub. No.: WO2024/000349
PCT Pub. Date: Jan. 4, 2024

(65) Prior Publication Data

US 2024/0331635 A1 Oct. 3, 2024

(51) Int. Cl.
*G09G 3/3233* (2016.01)

(52) U.S. Cl.
CPC ....... *G09G 3/3233* (2013.01); *G09G 2310/08* (2013.01); *G09G 2360/14* (2013.01)

(58) Field of Classification Search
None
See application file for complete search history.

(56) References Cited

U.S. PATENT DOCUMENTS

2003/0047736 A1* 3/2003 Hayashi ............... G09G 3/3233 257/E25.032
2005/0219229 A1* 10/2005 Yamaguchi ........... G06F 3/0412 345/173
2009/0135318 A1* 5/2009 Tateuchi ................. G06F 3/042 349/12

(Continued)

FOREIGN PATENT DOCUMENTS

CN 106952612 A 7/2017
CN 111312129 A 6/2020

(Continued)

OTHER PUBLICATIONS

CN114299849 (Year: 2022).*

(Continued)

*Primary Examiner* — Dorothy Harris
(74) *Attorney, Agent, or Firm* — Calfee, Halter & Griswold LLP

(57) ABSTRACT

A composite driving circuit and a display panel are provided. The display panel comprises a plurality of composite driving circuits and comprises a light-emitting element and a photodetector, which are driven by the composite driving circuits. The display panel comprises a plurality of row partitions, which are sequentially arranged in a column direction, wherein each row partition is provided with an enable signal line group for applying the same enable signal. The composite driving circuits and the photodetector, which is driven by the composite driving circuits, are respectively located in different row partitions.

16 Claims, 23 Drawing Sheets

(56) References Cited

U.S. PATENT DOCUMENTS

| | | | | |
|---|---|---|---|---|
| 2015/0348504 | A1* | 12/2015 | Sakariya | G09G 3/2092 345/82 |
| 2020/0074927 | A1* | 3/2020 | Xu | G09G 3/3233 |
| 2021/0027711 | A1* | 1/2021 | Qin | G06V 40/1318 |
| 2021/0056905 | A1* | 2/2021 | Liu | H10K 59/122 |
| 2023/0402014 | A1* | 12/2023 | Kim | G09G 3/3233 |

FOREIGN PATENT DOCUMENTS

| | | | | |
|---|---|---|---|---|
| CN | 111414793 | A | | 7/2020 |
| CN | 114253423 | A | | 3/2022 |
| CN | 114299849 | A | * | 4/2022 |
| CN | 114333665 | A | | 4/2022 |
| WO | 2022001516 | A1 | | 1/2022 |

OTHER PUBLICATIONS

International Search Report of PCT application No. PCT/CN2022/102642 dated Dec. 14, 2022.

Written Opinion of PCT application No. PCT/CN2022/102642 dated Dec. 14, 2022.

* cited by examiner

COMPOSITE DRIVING CIRCUIT AND DISPLAY PANEL

CROSS-REFERENCE TO RELATED APPLICATIONS

The present application is a U.S. National Stage of International Application No. PCT/CN2022/102642 filed on Jun. 30, 2022, the entire contents of which are incorporated herein by reference.

TECHNICAL FIELD

The present disclosure relates to the field of display technology, and specifically, to a composite driving circuit, a display panel and a display device.

BACKGROUND

In an optical fingerprint recognition display panel, a pixel driving circuit and a fingerprint recognition circuit are provided separately, which makes a driving circuit of the display panel more complicated.

It is to be noted that the information disclosed in the above background section is only used to enhance the understanding of the background of the present disclosure, and thus may include information that does not constitute the prior art known to those skilled in the art.

SUMMARY

The present disclosure provides a composite driving circuit, a display panel and a display device.

An aspect of the present disclosure provides a display panel including a plurality of composite driving circuits and including light-emitting elements and photodetectors driven by the composite driving circuits, the composite driving circuit including a first pixel driving circuit configured to drive the light-emitting element and an optical detection driving circuit configured to drive the photodetector, wherein the first pixel driving circuit includes a driving transistor and a first light-emitting control transistor, the driving transistor is configured to output a driving current for driving the light-emitting element under control of a voltage on a gate electrode of the driving transistor and the driving transistor is electrically connected to a pixel electrode of the light-emitting element through the first light-emitting control transistor, the optical detection driving circuit includes an output control transistor, and a device electrode of the photodetector is electrically connected to a sense signal line through the output control transistor, the display panel includes a plurality of row partitions sequentially arranged in a column direction, and each of the plurality of row partitions is provided with an enable signal line group to be applied with a same enable signal, and at least one of the plurality of row partitions is provided with the composite driving circuit, a gate electrode of the output control transistor and a gate electrode of the first light-emitting control transistor of the composite driving circuit are electrically connected to the enable signal line group, one of the first light-emitting control transistor and the output control transistor is configured to be turned on in response to a high level signal of the enable signal, and the other one of the first light-emitting control transistor and the output control transistor is configured to be turned on in response to a low level signal of the enable signal, and the composite driving circuit and the photodetector driven by the composite driving circuit are provided in different row partitions respectively.

In an embodiment of the present disclosure, the composite driving circuit and the photodetector driven by the composite driving circuit are provided in two adjacent row partitions respectively.

In an embodiment of the present disclosure, the driving transistor and the first light-emitting control transistor are P-type transistors, and the output control transistor is a metal-oxide semiconductor transistor.

In an embodiment of the present disclosure, the first pixel driving circuit further includes a storage capacitor and a data writing transistor, the gate electrode of the driving transistor is electrically connected to the storage capacitor so that the driving transistor outputs the driving current for driving the light-emitting element under the control of the voltage on the gate electrode of the driving transistor, and the data writing transistor is configured to write driving data into the storage capacitor.

In an embodiment of the present disclosure, the first pixel driving circuit further includes a capacitance reset transistor, a threshold compensation transistor, a second light-emitting control transistor and an electrode reset transistor, wherein a source electrode of the capacitance reset transistor is configured to be applied with a first initial voltage, a drain electrode of the capacitance reset transistor is electrically connected to a first node, and a gate electrode of the capacitance reset transistor is configured to be applied with a first reset signal, a source electrode of the threshold compensation transistor is electrically connected to a third node, a drain electrode of the threshold compensation transistor is electrically connected to the first node, and a gate electrode of the threshold compensation transistor is configured to be applied with a scanning signal, a source electrode of the driving transistor is electrically connected to a second node, a drain electrode of the driving transistor is electrically connected to the third node, and the gate electrode of the driving transistor is electrically connected to the first node, a source electrode of the data writing transistor is configured to be applied with the driving data, a drain electrode of the data writing transistor is electrically connected to the second node, and a gate electrode of the data writing transistor is configured to be applied with the scanning signal, a source electrode of the second light-emitting control transistor is configured to be applied with driving power, a drain electrode of the second light-emitting control transistor is electrically connected to the second node, and a gate electrode of the second light-emitting control transistor is configured to be applied with a same enable signal as a gate electrode of the first light-emitting control transistor, a source electrode of the first light-emitting control transistor is electrically connected to the third node, and a drain electrode of the first light-emitting control transistor is electrically connected to the pixel electrode of the light-emitting element, and a source electrode of the electrode reset transistor is configured to be applied with a second initial voltage, a drain electrode of the electrode reset transistor is electrically connected to the drain electrode of the first light-emitting control transistor, and a gate electrode of the electrode reset transistor is configured to be applied with a second reset signal.

In an embodiment of the present disclosure, the display panel includes a base substrate, a driving layer and a device layer stacked sequentially, and the first pixel driving circuit and the optical detection driving circuit are provided in the driving layer, and the light-emitting element and the photodetector are provided in the device layer.

In an embodiment of the present disclosure, in the row partition provided with the composite driving circuit, the enable signal line group includes at least one first enable signal line and at least one second enable signal line, and the gate electrode of each first light-emitting control transistor in the row partition is electrically connected to the first enable signal line, and the gate electrode of the output control transistor in the row partition is electrically connected to the second enable signal line.

In an embodiment of the present disclosure, the display panel includes a display area and a peripheral area surrounding the display area, and the composite driving circuit is provided in the display area, the first enable signal line and the second enable signal line extend through the display area in a row direction, and ends of the first enable signal line and the second enable signal line in a same enable signal line group are electrically connected in the peripheral area.

In an embodiment of the present disclosure, the device layer includes a pixel electrode layer, a pixel defining layer, a composite functional material layer, and a common electrode layer sequentially stacked and arranged on a side of the driving layer away from the base substrate, and the composite functional material layer includes a photoelectric conversion material layer and an electroluminescent material layer, the pixel electrode layer includes the pixel electrode of the light-emitting element, the device electrode of the photodetector and a device line, and the device electrode of the photodetector is electrically connected, through the device line, to the optical detection driving circuit for driving the photodetector.

In an embodiment of the present disclosure, in the composite driving circuit, a wiring area of the optical detection driving circuit is provided within a wiring area of the first pixel driving circuit.

In an embodiment of the present disclosure, the display panel further includes second pixel driving circuits and light-emitting elements driven by the second pixel driving circuits.

In an embodiment of the present disclosure, the composite driving circuits and the second pixel driving circuits are arranged in a plurality of driving circuit rows, and any one of the row partitions includes one or more of the driving circuit rows.

In an embodiment of the present disclosure, in any one of the row partitions, at most one of the driving circuit rows is provided with the composite driving circuit, the composite driving circuits and the second pixel driving circuits are arranged in a plurality of driving circuit columns, and respective optical detection driving circuits provided in a same driving circuit column are electrically connected to a same sense signal line.

In an embodiment of the present disclosure, the composite driving circuits and the second pixel driving circuits are arranged in a plurality of driving circuit columns, and the composite driving circuits in at least one of the driving circuit columns are provided in a same row partition, and the composite driving circuits provided in the same row partition and in a same driving circuit column are connected to different sense signal lines respectively.

In an embodiment of the present disclosure, the composite driving circuits and the second pixel driving circuits are arranged in a plurality of driving circuit columns, the display panel includes driving power lines respectively corresponding to respective driving circuit columns, each of the first pixel driving circuit and the second pixel driving circuit in the driving circuit column is electrically connected to a corresponding driving power line, the display panel is further provided with a power row line provided in a same layer as the enable signal line group, and the power row line extends in a row direction and is electrically connected to each of the driving power lines.

In an embodiment of the present disclosure, the first pixel driving circuit is the same as the second pixel driving circuit.

A second aspect of the present disclosure provides a display device including the display panel described above.

A third aspect of the present disclosure provides a composite driving circuit including a first pixel driving circuit configured to drive a light-emitting element and an optical detection driving circuit configured to drive a photodetector, wherein the first pixel driving circuit includes a driving transistor and a first light-emitting control transistor, the driving transistor is configured to output a driving current for driving the light-emitting element under control of a voltage on a gate electrode of the driving transistor, and the driving transistor is electrically connected to a pixel electrode of the light-emitting element through the first light-emitting control transistor, the optical detection driving circuit includes an output control transistor, and a device electrode of the photodetector is electrically connected to an output terminal of the optical detection driving circuit through the output control transistor, a gate electrode of the first light-emitting control transistor and a gate electrode of the output control transistor are configured to be applied with a same enable signal, one of the first light-emitting control transistor and the output control transistor is configured to be turned on in response to a high level signal of an enable signal, and the other one of the first light-emitting control transistor and the output control transistor is configured to be turned on in response to a low level signal of the enable signal.

In an embodiment of the present disclosure, the driving transistor and the first light-emitting control transistor are P-type transistors, and the output control transistor is a metal-oxide semiconductor transistor.

In an embodiment of the present disclosure, the first pixel driving circuit further includes a storage capacitor and a data writing transistor, the gate electrode of the driving transistor is electrically connected to the storage capacitor so that the driving transistor outputs the driving current for driving the light-emitting element under the control of the voltage on the gate electrode of the driving transistor, and the data writing transistor is configured to write driving data into the storage capacitor.

In an embodiment of the present disclosure, the first pixel driving circuit further includes a capacitance reset transistor, a threshold compensation transistor, a second light-emitting control transistor and an electrode reset transistor, wherein a source electrode of the capacitance reset transistor is configured to be applied with a first initial voltage, a drain electrode of the capacitance reset transistor is electrically connected to a first node, and a gate electrode of the capacitance reset transistor is configured to be applied with a first reset signal, a source electrode of the threshold compensation transistor is electrically connected to a third node, a drain electrode of the threshold compensation transistor is electrically connected to the first node, and a gate electrode of the threshold compensation transistor is configured to be applied with a scanning signal, a source electrode of the driving transistor is electrically connected to a second node, a drain electrode of the driving transistor is electrically connected to the third node, and the gate electrode of the driving transistor is electrically connected to the first node, a source electrode of the data writing transistor is configured to be applied with a driving data, a drain electrode of the data writing transistor is electrically connected to the second node, and a gate electrode of the data writing transistor is configured to be applied with the scanning signal, a source electrode of the second light-emitting control transistor is configured to be applied with driving power, a drain electrode of the second light-emitting control transistor is electrically connected to the second node, and a gate electrode of the second light-emitting control transistor is configured to be applied with a same enable signal as the gate electrode of the first light-emitting control transistor, a source electrode of the first light-emitting control transistor is electrically connected to the third node, and a drain electrode of the first light-emitting control transistor is electrically connected to the pixel electrode of the light-emitting element, and a source electrode of the electrode reset transistor is configured to be applied with a second initial voltage, a drain electrode of the electrode reset transistor is electrically connected to the drain electrode of the first light-emitting control transistor, and a gate electrode of the electrode reset transistor is configured to be applied with a second reset signal.

It should be understood that the above general description and the following detailed descriptions are exemplary and explanatory only and do not limit the embodiments of the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principle of the present disclosure. Obviously, the accompanying drawings in the following description are only some of the embodiments of the present disclosure, and those skilled in the art may obtain other accompanying drawings from these drawings without creative work.

DETAILED DESCRIPTION

Figure 1:
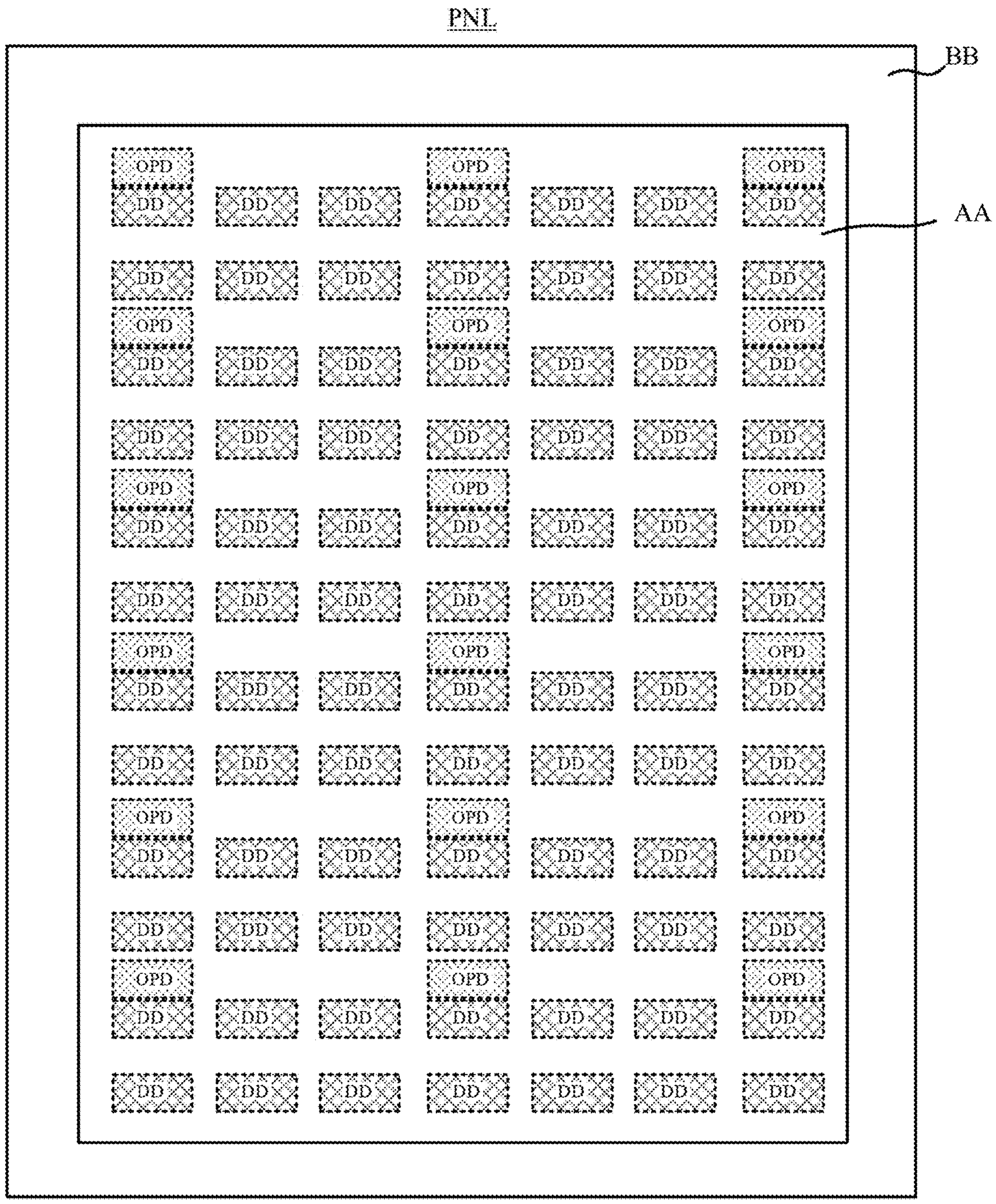
FIG. 1 is a schematic diagram of a distribution of light-emitting elements and photodetectors on a display panel in an embodiment of the present disclosure.

Example embodiments will now be described more fully with reference to the accompanying drawings. However, the example embodiments can be implemented in a variety of forms and should not be construed as being limited to the embodiments set forth herein; rather, these embodiments are provided so that the present disclosure is comprehensive and complete and the concept of the example embodiments is comprehensively conveyed to those skilled in the art. The same reference numbers in the drawings denote the same or similar structures, and thus detailed descriptions thereof will be omitted. In addition, the accompanying drawings are only schematic illustrations of the present disclosure and are not necessarily drawn to scale.

Although relative terms such as "on" and "under" are used in this specification to describe the relative relationship of one component with respect to another component shown, these terms are used in the specification only for convenience of description, for example, based on the example orientation in the accompanying drawings. It will be understood that if a device shown is turned upside down, the component described as being "on" will become the component described as being "under". When a structure is "on" another structure, it may mean that the structure is integrally formed on said another structure, or that the structure is "directly" provided on said another structure, or that the structure is "indirectly" provided on said another structure through an additional structure.

The terms "a", "an", "the", "said" and "at least one" are used to indicate the presence of one or more elements/components/etc.; the terms "including" and "having" are used to indicate open-ended inclusion and mean that there may be additional elements/components/etc. in addition to those listed; and the terms "first", "second", and "third", etc., are used only as markers and are not intended to limit the quantity of the objects thereof.

A transistor is an element that includes at least three terminals, namely a gate electrode, a drain electrode, and a source electrode. The transistor has a channel region between the drain electrode (a drain terminal or a drain region) and the source electrode (a source terminal or a source region), and a current may flow through the drain electrode, the channel region, and the source electrode. The channel region is a region through which the current flows predominantly. The functions of the "source electrode" and the "drain electrode" are sometimes interchanged when transistors with opposite polarities are used or when the direction of the current changes in circuit operation. Therefore, in this specification, the "source electrode" and the "drain electrode" may be interchangeable and respectively refer to two opposite terminals (terminals other than the gate electrode) of a transistor, which only differs the two terminals from each other in naming instead of defining an input terminal or output terminal of the transistor that has a specific current flow direction.

In an embodiment of the present disclosure, a structure layer A is on a side of a structure layer B away from a base substrate, which may be understood as that the structure layer A is formed on the side of the structure layer B away from the base substrate. When the structure layer B is a patterned structure, a portion of the structure layer A may also be at the same physical height as that of the structure layer B or at a lower physical height than that of the structure layer B, in which case the base substrate is the height reference.

Figure 2:
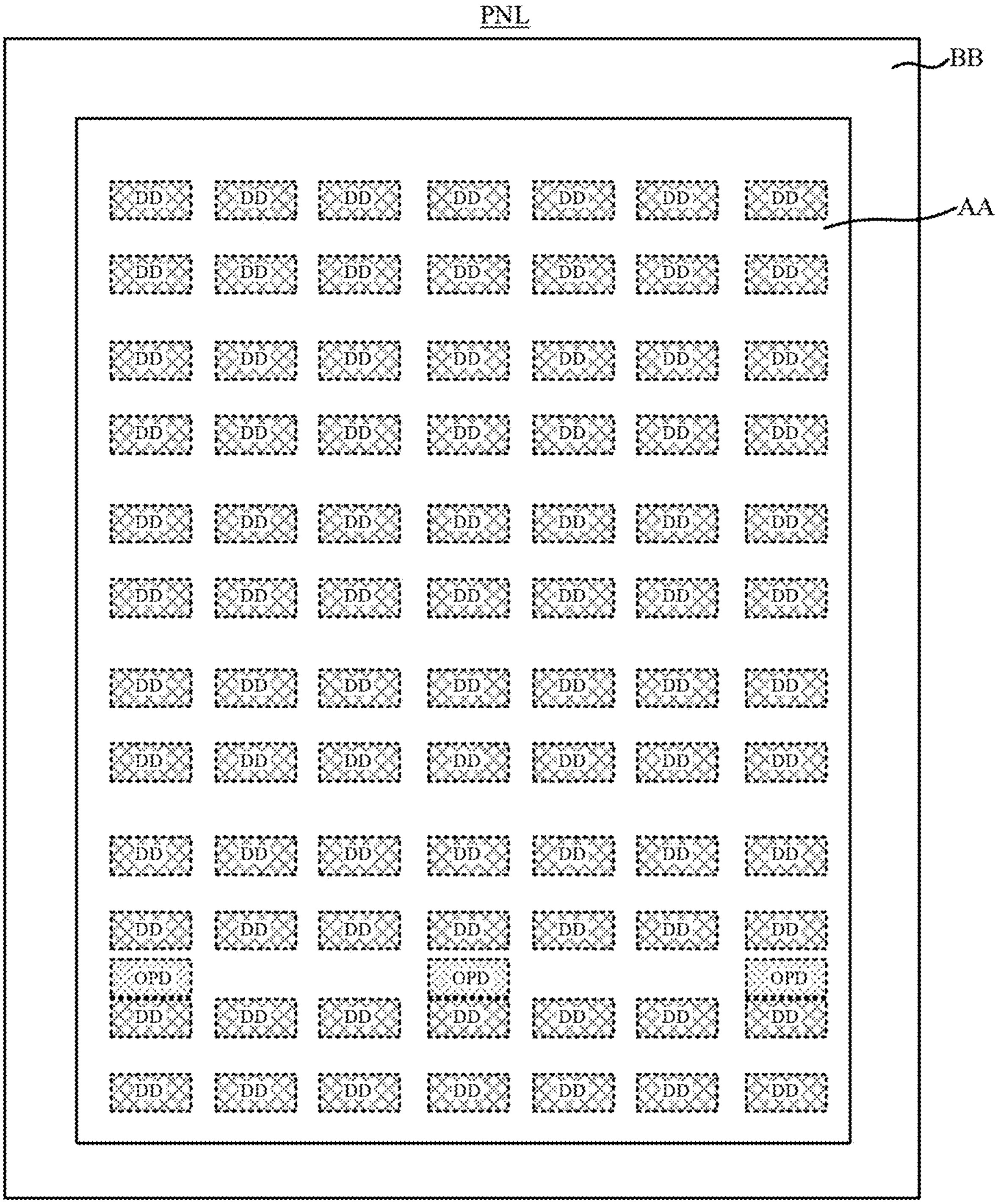
FIG. 2 is a schematic diagram of a distribution of light-emitting elements and photodetectors on a display panel in an embodiment of the present disclosure.
Figure 3:
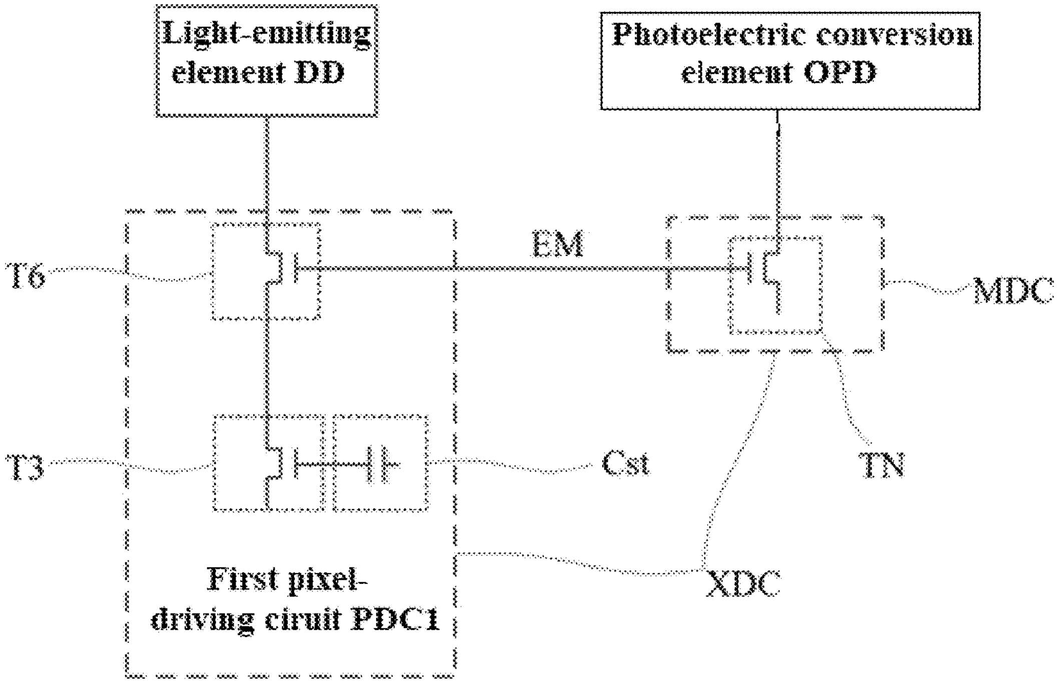
FIG. 3 is a schematic diagram of a structure of a composite driving circuit in an embodiment of the present disclosure.

The present disclosure provides a display panel PNL and a display device applying the display panel PNL. Referring to FIGS. 1, 2, and 3, the display panel PNL includes a display area AA and a peripheral area BB surrounding the display area AA. In the display area AA, the display panel PNL is provided with light-emitting elements DD and pixel driving circuits PDC (not shown in FIGS. 1 and 2) for driving the light-emitting elements DD. In at least a portion of the display area AA, the display panel PNL is further provided with photodetectors OPD and optical detection driving circuits MDC (not shown in FIGS. 1 and 2) for driving the photodetectors OPD.

In this way, the display device (e.g., a mobile phone, a watch, a laptop screen, or the like) according to an embodiment of the present disclosure may drive the light-emitting element DD by the pixel driving circuit PDC to achieve a screen display; and drive the photodetector OPD by the optical detection driving circuit MDC to achieve an optical detection, and then utilize the result of the optical detection to achieve fingerprint identification, touch control, ambient light detection, heart rate monitoring, or other functions. In an embodiment of the present disclosure, the photodetectors OPD may be arranged in an array, for example, in a local area of the display area AA (as shown in FIG. 2) or in the entire display area AA (as shown in FIG. 1). When the photodetector OPDs are arranged in a local area, the optical detection may be performed in the local area where the photodetector OPDs are arranged, for example, to achieve the fingerprint identification in the local area by the optical detection. When the photodetector OPDs are arranged in the entire display area AA, the optical detection may be performed in the entire display area AA, for example to achieve full-screen fingerprint recognition or touch control by the optical detection.

Figure 5:
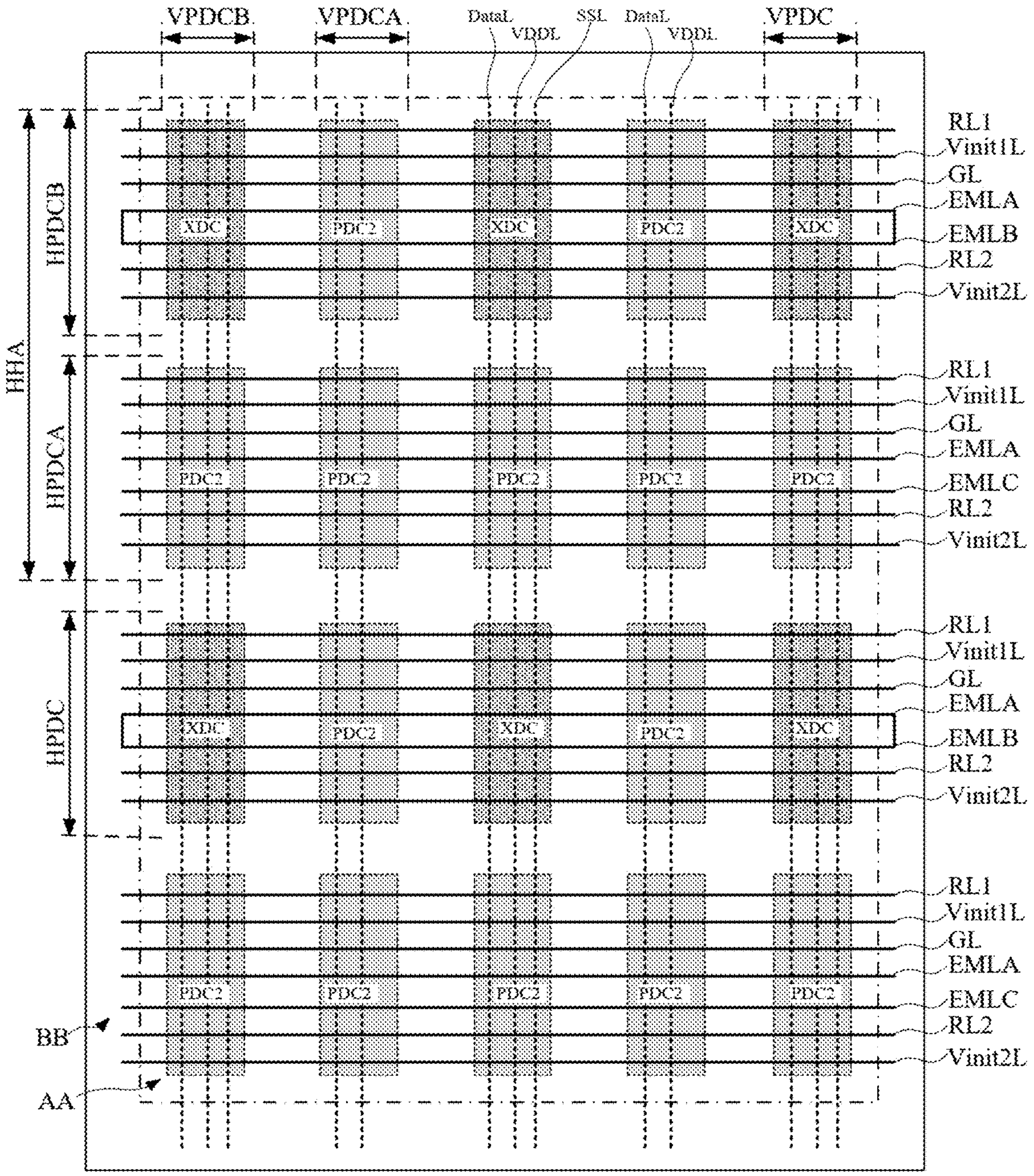
FIG. 5 is a schematic diagram of a distribution of driving circuits of a driving layer in an embodiment of the present disclosure.

In the display panel PNL according to an embodiment of the present disclosure, at least a portion of a wiring area of the pixel driving circuit PDC is overlapped with that of the optical detection driving circuit MDC, for example, the wiring area of the optical detection driving circuit MDC is provided within the wiring area of the pixel driving circuit PDC. In an embodiment of the present disclosure, the pixel driving circuit PDC and the optical detection driving circuit MDC, which are overlapped with each other, may form a composite driving circuit XDC. The pixel driving circuit PDC forming the composite driving circuit XDC may be defined as a first pixel driving circuit PDC1, and the pixel driving circuit PDC which is not a part of the composite driving circuit XDC may be defined as a second pixel driving circuit PDC2 (as shown in FIG. 5). In an embodiment of the present disclosure, all of the pixel driving circuits PDC may be the first pixel driving circuits PDC1, or some of the pixel driving circuits PDC may be the first pixel driving circuits PDC1 and the other pixel driving circuits PDC may be the second pixel driving circuits PDC2. In other words, in the display panel PNL of the present disclosure, the display area AA may at least include the composite driving circuit XDC, the composite driving circuit XDC includes the first pixel driving circuit PDC1 for driving the light-emitting element DD and the optical detection driving circuit MDC for driving the photodetector OPD. In some embodiments, the display panel PNL may not include the second pixel driving circuit PDC2. In some other embodiments, the display panel PNL may further include the second pixel driving circuit PDC2 and the light-emitting element DD driven by the second pixel driving circuit PDC2. In an embodiment, the first pixel driving circuit PDC1 and the second pixel driving circuit PDC2 may be the same or different. In the present disclosure, the first pixel driving circuit PDC1 and the second pixel driving circuit PDC2 are exemplarily illustrated as the same pixel driving circuit PDC.

In an embodiment of the present disclosure, the display panel PNL may be provided with two kinds of driving circuits, i.e., the composite driving circuit XDC and the second pixel driving circuit PDC2, in which the composite driving circuit XDC includes the first pixel driving circuit PDC1 and the optical detection driving circuit MDC, the first pixel driving circuit PDC1 and the optical detection driving circuit MDC are provided to be overlapped with each other, and the first pixel driving circuit PDC1 and the second pixel driving circuit PDC2 may be the same.

In an embodiment of the present disclosure, the first pixel driving circuit PDC1 for driving the light-emitting element DD and the optical detection driving circuit MDC for driving the photodetector OPD are provided to be overlapped with each other, so that the optical detection driving circuit MDC may not occupy the wiring space of the pixel driving circuit PDC, which thus avoids that the pixel driving circuit PDC is provided too small in size in order to keep clear of the optical detection driving circuit MDC and may avoid constraints on the distribution density of the pixel driving circuits PDC. Thus, in some cases, the stability of the driving process of the light-emitting element DD may be ensured by avoiding a reduction in the size of the pixel driving circuit PDC, and in particular, the effects of cross-talk, insufficient charging, insufficient voltage holding capacity, and the like on the display effect may be reduced. In some cases, it may be possible to enable the display panel PNL to have a higher resolution by providing more pixel driving circuits PDC.

In some embodiments of the present disclosure, referring to FIG. 3, the optical detection driving circuit MDC may include an output control transistor TN, and the photodetector OPD is electrically connected to an output terminal of the optical detection driving circuit MDC through the output control transistor TN, for example, the photodetector OPD is electrically connected to a sense signal line SSL through the output control transistor TN. In an example, the output control transistor TN may be turned on in response to a second level signal applied to a gate electrode TNG of the output control transistor, and may be turned off in response to a first level signal applied to the gate electrode TNG of the output control transistor.

Referring to FIGS. 5 to 10, lines are also provided in the display area AA. These lines are used to apply signals to the pixel driving circuit PDC and the optical detection driving circuit MDC and to transmit signals of the optical detection driving circuit MDC. These lines may include row lines extending along a row direction DH and column lines extending along a column direction DV. The display panel PNL may have different lines according to different pixel driving circuits PDC and optical detection driving circuits MDC.

In an example, the column line includes a driving power line VDDL, a data line DataL, and a sense signal line SSL. The driving power line VDDL is used to provide a driving power VDD to the pixel driving circuit PDC, the data line DataL is used to provide a driving data Data to the pixel driving circuit PDC, and under the drive by the driving power VDD, the pixel driving circuit PDC may output a driving current for driving the light-emitting element DD according to the driving data Data. The signal generated by the optical detector OPD is transmitted to the sense signal line SSL through the optical detection driving circuit MDC and thus transmitted to a corresponding control component (e.g., a fingerprint recognition chip) through the sense signal line SSL.

In an example, the composite driving circuits XDC and the second pixel driving circuits PDC2 are arranged to form a plurality of driving circuit columns VPDC, the driving circuit columns VPDC are arranged along the row direction DH, and each driving circuit column VPDC includes a plurality of driving circuits arranged sequentially along the column direction DV. In the same driving circuit column VPDC, the pixel driving circuits PDC may include only the composite driving circuit XDC, or only the second pixel driving circuits PDC2, or may include a portion of the composite driving circuits XDC and a portion of second pixel driving circuits PDC2.

In an embodiment, in the display panel PNL, each driving circuit column VPDC corresponds to one column line group, and each column line group includes the driving power line VDDL and the data line DataL for driving each driving circuit in the driving circuit column VPDC. If the driving circuit column VPDC has the composite driving circuits XDC, the column line group corresponding to the driving circuit column VPDC may also include the sense signal line SSL for receiving output signals from the optical detection driving circuits MDC of these composite driving circuits XDC. In other words, if each of the pixel driving circuits PDC in the driving circuit column VPDC is the second pixel driving circuit PDC2, the column line group corresponding to the driving circuit column VPDC may include the data line DataL and the power line VDDL for driving each of the second pixel driving circuits PDC2. If the driving circuit column VPDC includes both the composite driving circuit XDC and the second pixel driving circuit PDC2, or includes only the composite driving circuit XDC, the column line group corresponding to the driving circuit column VPDC may include the data line DataL, the driving power line VDDL, and the sense signal line SSL.

In an example, one driving power line VDDL may be provided to drive respective pixel driving circuits PDC in the same driving circuit column VPDC, i.e., one column line group may include a single driving power line VDDL. In an embodiment, the display panel PNL may also be provided with a driving power auxiliary line VDDLA (not shown in FIGS. 5 to 10) connected in parallel to the driving power line VDDL, to reduce the impedance of the driving power line VDDL. The driving power line VDDL and the driving power auxiliary line VDDLA may be provided in two different conductive layers (e.g., in a first source-drain metal layer SD1 and a second source-drain metal layer SD2, respectively), and in particular, the two may be provided to be overlapped with each other. Of course, in other embodiments of the present disclosure, two adjacent driving power lines VDDL may be electrically connected to each other and combined to form a wider driving power line VDDL, e.g., two adjacent pixel driving circuits PDC may be provided in mirror symmetry.

In an example, one data line DataL may be provided to drive respective pixel driving circuits PDC in the same driving circuit column VPDC, i.e., one column line group may include a single data line DataL. Of course, if required, the display panel PNL may also be provided with a plurality of data lines DataL (e.g., two) for each driving circuit column VPDC, i.e., one column line group may include a plurality of data lines DataL, and two pixel driving circuits PDC adjacent in the column direction may be driven with different data lines DataL. For example, in order to improve the refresh rate of the display panel PNL, each column line group may include two data lines DataL, and two pixel driving circuits PDC adjacent in the column direction may be driven with different data lines DataL respectively. Of course, in other embodiments of the present disclosure, some of the pixel driving circuits PDC in two adjacent driving circuit columns VPDC may also share the same data line DataL, for example, the pixel driving circuits PDC in the even-numbered rows of respective driving circuit columns VPDC are connected to the data line DataL on the right side and the pixel driving circuits PDC in the odd-numbered rows are connected to the data line DataL on the left side, or vice versa.

In the present disclosure, the arranging manner, the number, the shape, the position or the like of the data line DataL and the driving power line VDDL may be set according to the needs of the pixel driving circuit PDC, which will not be described in the present disclosure in detail herein.

In an embodiment of the present disclosure, each driving circuit column VPDC has the composite driving circuit XDC, so that the photodetector OPD driven by the composite driving circuit XDC has a larger resolution in the row direction DH. In another embodiment of the present disclosure, referring to FIGS. 5 to 8, the driving circuit columns VPDC may include a first driving circuit column VPDCA and a second driving circuit column VPDCB, the first driving circuit column VPDCA includes only the second pixel driving circuit PDC2, and the second driving circuit column VPDCB includes the composite driving circuit XDC. Of course, the second driving circuit column VPDCB may or may not include the second pixel driving circuit PDC2, which may be determined according to the resolution requirement of the photodetector OPD in the row direction DH. In an embodiment, at least one first driving circuit column VPDCA is provided between two adjacent second driving circuit columns VPDCB, which may reduce the resolution of the photodetector OPD in the row direction DH, and reduce the cost and the power consumption of the display panel PNL on the premise of satisfying the optical detection requirements.

Figure 6:
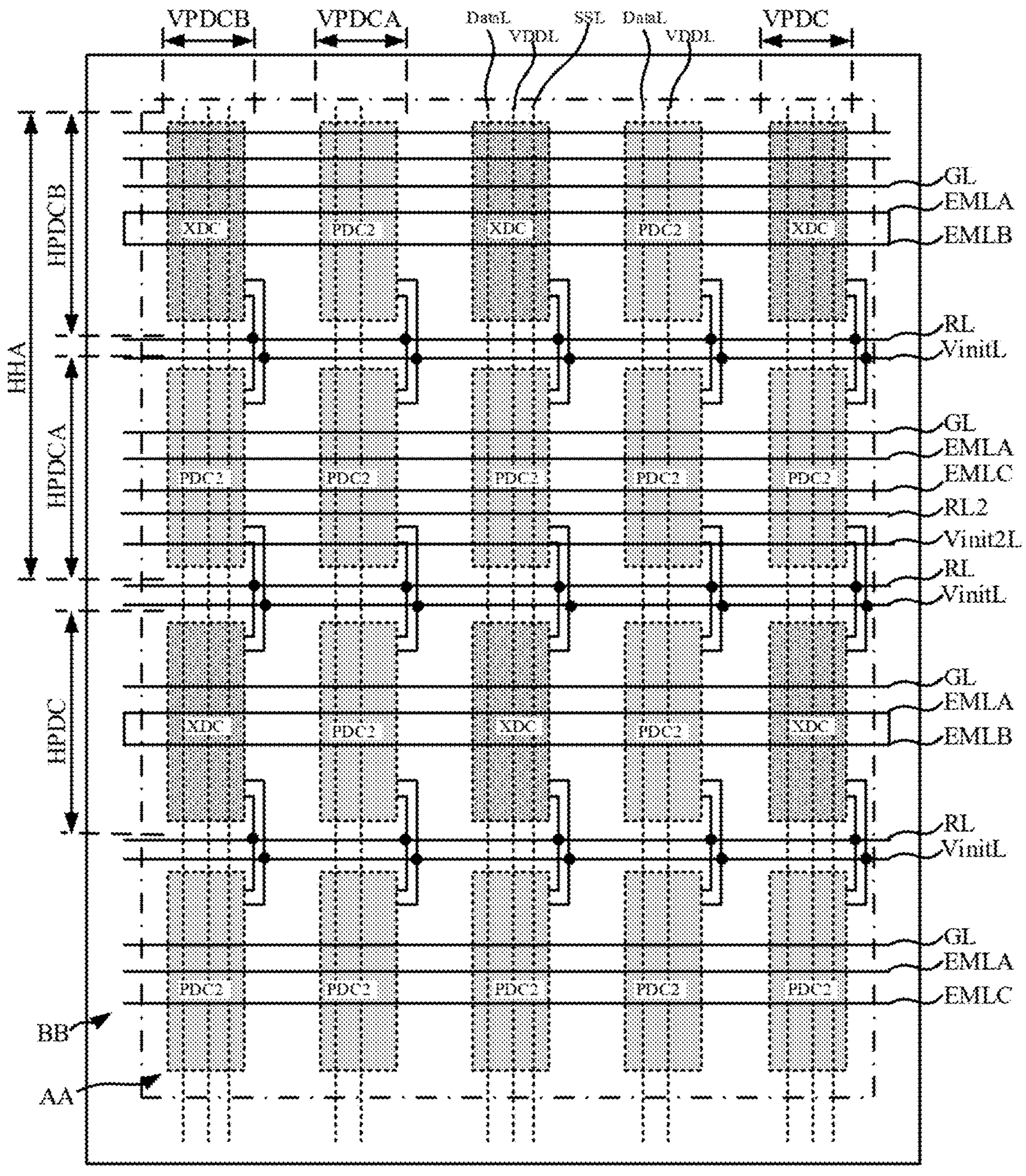
FIG. 6 is a schematic diagram of a distribution of driving circuits of a driving layer in an embodiment of the present disclosure.

In an example, referring to FIGS. 5 and 6, the first driving circuit column VPDCA and the second driving circuit column VPDCB are sequentially spaced apart. In this way, the resolution of the photodetector OPD is half the resolution of the light-emitting element DD in the row direction DH.

Figure 7:
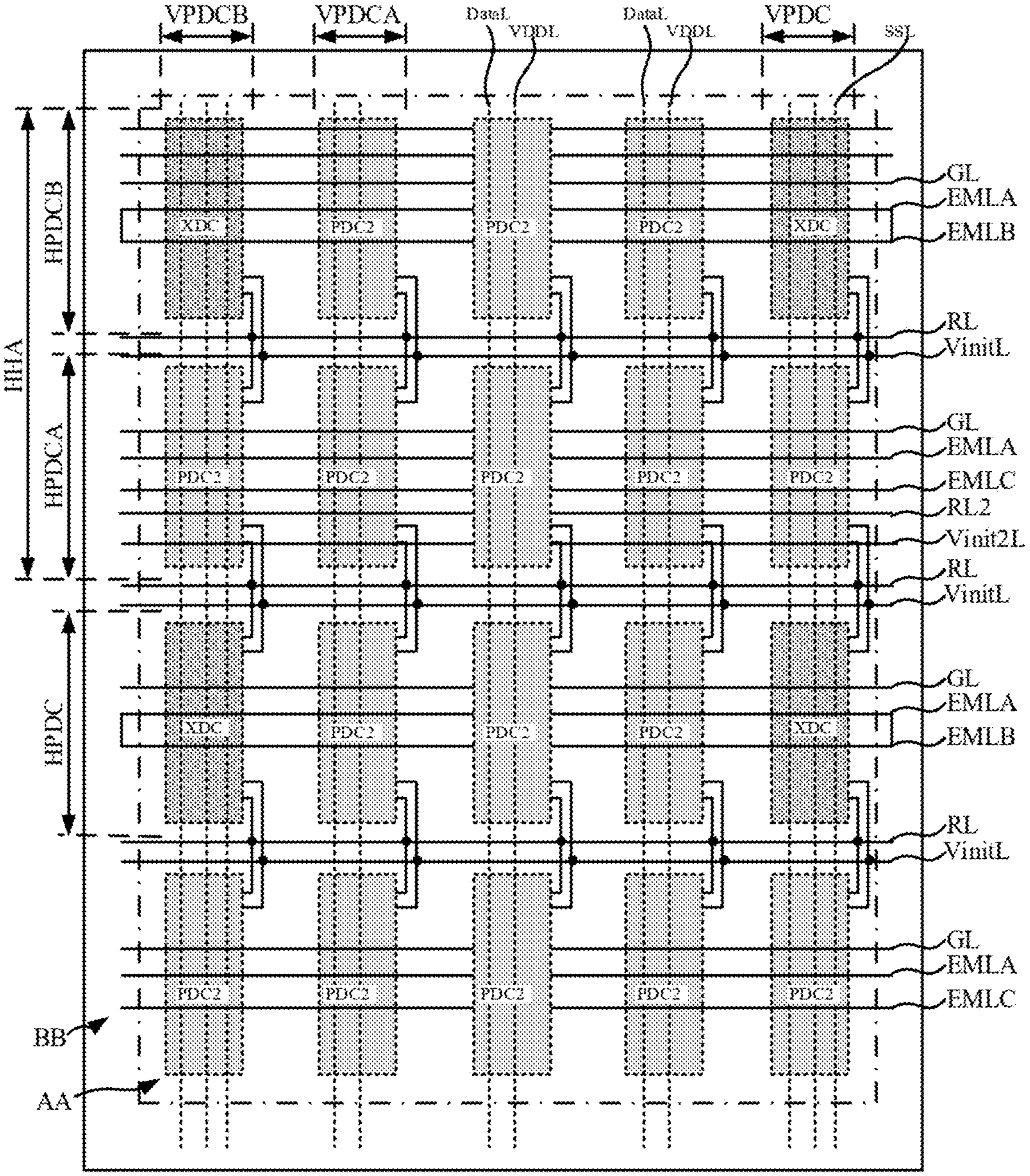
FIG. 7 is a schematic diagram of a distribution of driving circuits of a driving layer in an embodiment of the present disclosure.
Figure 8:
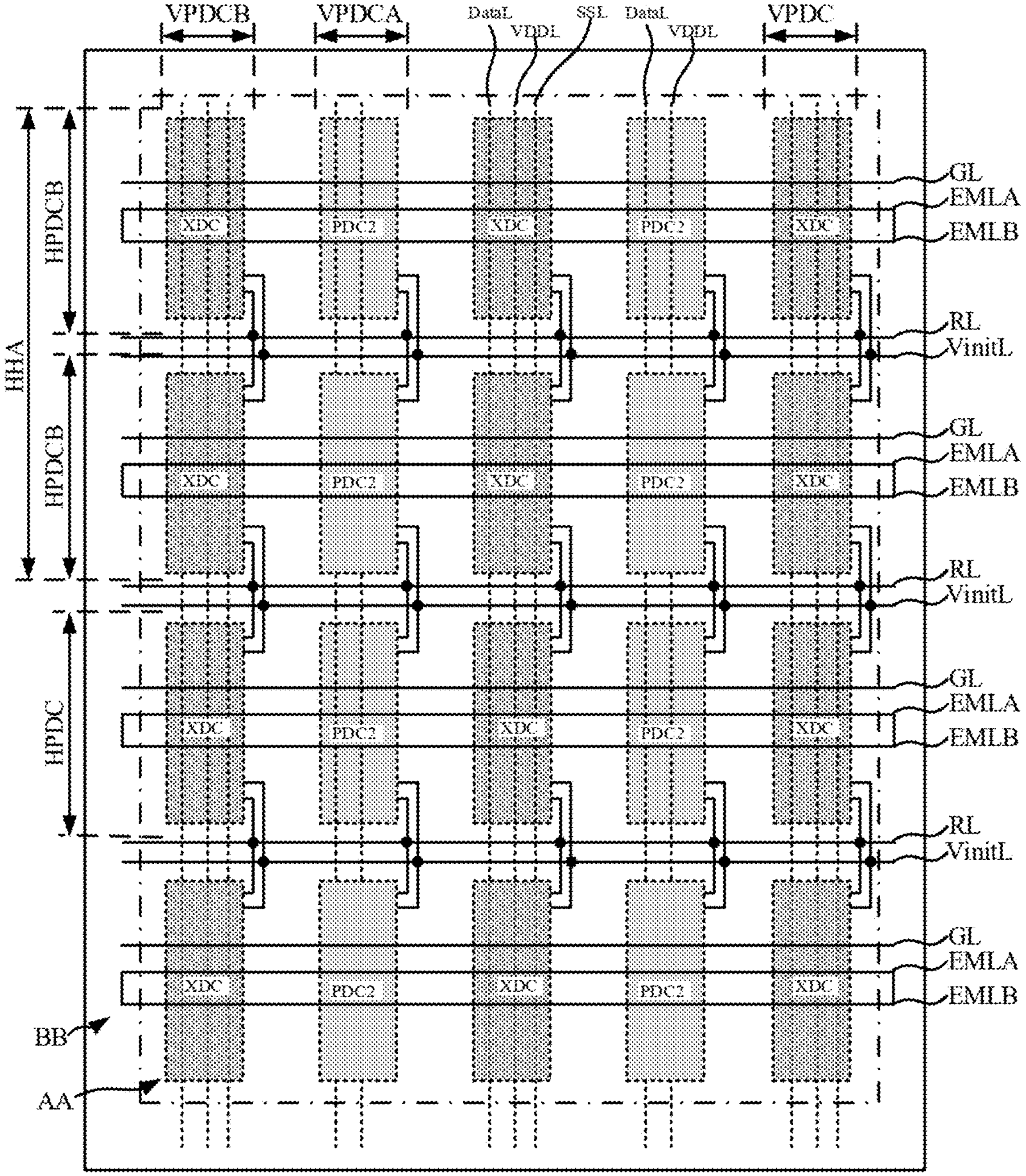
FIG. 8 is a schematic diagram of a distribution of driving circuits of a driving layer in an embodiment of the present disclosure.

In another example, referring to FIG. 7, the second driving circuit column VPDCB is provided every three first driving circuit columns VPDCA. In this way, the resolution of the photodetector OPD is ¼ of the resolution of the light-emitting element DD in the row direction DH.

In an embodiment of the present disclosure, referring to FIGS. 5 to 8, the composite driving circuits XDC and the second pixel driving circuits PDC2 may be arranged into a plurality of driving circuit rows HPDC arranged along the column direction DV, and each driving circuit row HPDC includes a plurality of driving circuits arranged in the same row. The display panel PNL may be divided into a plurality of row partition HHAs sequentially arranged along the column direction DV, and each row partition HHA includes one driving circuit row HPDC or a plurality of adjacent driving circuit rows HPDC. An enable signal line group EMLS for applying the same enable signal EM is provided in the same row partition HHA. The composite driving circuit XDC is provided in at least one row partition HHA. Referring to FIG. 3, the first pixel driving circuit PDC1 is provided with a first light-emitting control transistor T6, and the first light-emitting control transistor T6 is configured to control whether or not the driving current of the first pixel driving circuit PDC1 can flow to the light-emitting element DD. In the row partition HHA in which the composite driving circuit XDC is provided, a gate electrode TNG of the output control transistor and a gate electrode T6G of the first light-emitting control transistor T6 of the first pixel driving circuit PDC1 in the row partition HHA are both connected to the enable signal line group EMLS. When an enable signal EM on the enable signal line group EMLS is a first-level signal, the first light-emitting control transistor T6 is turned on so that the driving current of the first pixel driving circuit PDC1 can flow through the light-emitting element DD, and when the enable signal EM on the enable signal line group EMLS is a second level signal, the first light-emitting control transistor T6 is turned off so that the driving current of the first pixel driving circuit PDC1 cannot flow through the light-emitting element DD. In this way, at least one row partition HHAs is provided with the composite driving circuit XDC, the gate electrode TNG of the output control transistor and the gate electrode T6G of the first light-emitting control transistor of the composite driving circuit XDC are electrically connected with the enable signal line group EMLS, one of the first light-emitting control transistor T6 and the output control transistor TN is to be turned on in response to a high level signal of the enable signal EM, and the other one is to be turned on in response to a low level signal of the enable signal EM.

Further, each second pixel driving circuit PDC2 in the same row partition HHA also includes the first light-emitting control transistor T6, and the gate electrode T6G of the first light-emitting control transistor of the second pixel driving circuit PDC2 is also connected to the enable signal line group EMLS. In this way, in the same row partition HHA, the gate electrode T6G of each first light-emitting control transistor and the gate electrode of the output control transistor are connected to the same enable signal line group EMLS.

In an embodiment, the enable signal line group EMLS may include one enable signal line or may include a plurality of enable signal lines. In an example, in one row partition HHA, the enable signal line group EMLS includes first enable signal lines EMLA each corresponding to one driving circuit row HPDC, and each first enable signal line EMLA is used to drive the corresponding driving circuit row HPDC. When the row partition HHA also includes the composite driving circuit XDC, the enable signal line group EMLS also includes a second enable signal line EMLB each corresponding to one row of the composite driving circuits XDC, and each second enable signal line EMLB is used to drive the optical detection driving circuits MDC in the same row.

In an embodiment of the present disclosure, referring to FIGS. 4 to 8, the display panel PNL includes a scanning line GL and the first enable signal line EMLA extending along the row direction DH. The first enable signal line EMLA is used to control whether a driving current of the pixel driving circuit PDC can be applied to the light-emitting element DD driven thereby. For example, the pixel driving circuit PDC may include a driving transistor T3 and the first light-emitting control transistor T6. The driving transistor T3 may output a driving current for driving the light-emitting element DD under the control of a voltage on a gate electrode T3G of the driving transistor. The driving transistor T3 is electrically connected to a pixel electrode of the light-emitting element DD through the first light-emitting control transistor T6. The gate electrode T6G of the first light-emitting control transistor may be electrically connected to the first enable signal line EMLA. When a signal on the first enable signal line EMLA causes the first light-emitting control transistor T6 to be turned off, the driving transistor T3 cannot generate the driving current according to the voltage on the gate electrode T3G of the driving transistor, and the light-emitting element DD cannot emit light. When the signal on the first enable signal line EMLA causes the first light-emitting control transistor T6 to be turned on, the driving transistor T3 may output the driving current under the control of the voltage on the gate electrode T3G of the driving transistor when the required conditions such as the provision of the driving power supply VDD are satisfied, and the driving current may flow through the light-emitting element DD and drive the light-emitting element DD to emit light.

The scanning line GL is used to control whether or not the driving data Data on the data line DataL can be written to the pixel driving circuit PDC electrically connected to the data line DataL. For example, the pixel driving circuit PDC may be provided with a data writing transistor T4, a storage capacitor Cst, and the like. The gate terminal T3G of the driving transistor is electrically connected to the storage capacitor Cst, and the driving transistor outputs the driving current for driving the light-emitting element DD under the control of the voltage on the gate electrode T3G of the driving transistor. The data writing transistor T4 is configured to write the driving data Data into the storage capacitor Cst. Specifically, the storage capacitor Cst may be electrically connected to the gate electrode T3G (as the first node N1) of the driving transistor, the gate electrode T4G of the data writing transistor is electrically connected to the scanning line GL, and the source electrode T4S of the data writing transistor is electrically connected to the data line DataL. When a signal on the gate electrode T4G of the data writing transistor causes the data writing transistor T4 to be turned on, the driving data Data on the data line DataL may be applied onto the pixel driving circuit PDC, and specifically may be written into the storage capacitor Cst to control the voltage of the first node N1. In this way, when the pixel driving circuit PDC can output the driving current, the driving current is related to the driving data Data written into the pixel driving circuit PDC. Therefore, in some embodiments, the row line corresponding to the driving circuit row HPDC may include the first enable signal line EMLA and the scanning line GL.

In some embodiments of the present disclosure, the display panel PNL may also be provided with a reset control line RL and an initial voltage line VinitL extending along the row direction DH. The reset control line RL controls the reset of the pixel driving circuit PDC, for example, controlling the pixel driving circuit PDC to reset the first node N1 before writing the driving data Data (writing a signal applied on the initial voltage line VinitL into the first node N1), or controlling the pixel driving circuit PDC to reset the pixel electrode of the light-emitting element DD before or after the light-emitting element DD emits light (writing the signal applied on the initial voltage line VinitL into the pixel electrode of the light-emitting element DD). In an example, the reset control line RL may include a first reset control line RL1 and a second reset control line RL2, and the initial voltage line VinitL includes a first initial voltage line VInit1L and a second initial voltage line Vinit2L. The first reset control line RL1 is used to control the pixel driving circuit PDC to reset the first node N1 before writing the driving data Data, specifically, by writing a first initial voltage Vinit1 applied on the first initial voltage line VInit1L into the first node N1 in response to the first reset signal Re1. The second reset control line RL2 is used to control the pixel driving circuit PDC to reset the pixel electrode of the light-emitting element DD before or after the light-emitting element DD emits light, specifically, by writing a second initial voltage Vinit2 applied on the second initial voltage line Vinit2L into the pixel electrode of the light-emitting element DD in response to the second reset signal Re2. The first reset control line RL1 and the second reset control line RL2 may be two different lines or the same line. When the first reset control line RL1 and the second reset control line RL2 are two different lines, the signals on the first reset control line RL1 and the second reset control line RL2 may or may not be the same. The first initial voltage line VInit1L and the second initial voltage line Vinit2L may be two different lines or the same line (i.e., the initial voltage line VinitL). When the first initial voltage line VInit1L and the second initial voltage line Vinit2L are two different lines, the first initial voltage Vinit1 and the second initial voltage Vinit2 may or may not be the same.

For example, in an example, the pixel driving circuit PDC includes a capacitance reset transistor T1, a source electrode TIS of the capacitance reset transistor is electrically connected to the initial voltage line VinitL1, a gate electrode T1G of the capacitance reset transistor is electrically connected to the first reset control line RL1, and a drain electrode T1D of the capacitance reset transistor is electrically connected to the first node N1. When the signal on the first reset control line RL1 causes the capacitance reset transistor T1 to be turned on, the first initial voltage may be applied to the first node N1 such that the voltage of the first node N1 is reset to the first initial voltage.

For another example, in an example, the pixel driving circuit PDC includes an electrode reset transistor T7, a source electrode T7S of the electrode reset transistor is electrically connected to the initial voltage line VinitL2, a gate electrode T7G of the electrode reset transistor is electrically connected to the second reset control line RL2, and a drain electrode T7D of the electrode reset transistor is electrically connected to the pixel electrode of the light-emitting element DD. When the signal on the second reset control line RL2 causes the electrode reset transistor T7 to be turned on, the second initial voltage may be applied to the pixel electrode of the light-emitting element DD such that the voltage of the pixel electrode of the light-emitting element DD is reset to the second initial voltage.

Therefore, in some embodiments, the row line corresponding to the driving circuit row HPDC may further include the reset control line RL and the initial voltage line VinitL, for example, including the first reset control line RL1, the second reset control line RL2, the first initial voltage line VInit1L, and the second initial voltage line Vinit2L.

Further, in two adjacent rows of pixel driving circuits PDC, the second reset control line RL2 connected to the pixel driving circuits PDC in a previous row and the first reset control line RL1 connected to the pixel driving circuits PDC in a next row are the same line, and the second initial voltage line Vinit2L connected to the pixel driving circuits PDC in the previous row and the first initial voltage line VInit1L connected to the pixel driving circuits PDC in the next row are the same line. In other words, in the row lines respectively corresponding to the two adjacent driving circuit rows HPDC, the second reset control line RL2 corresponding to the previous driving circuit row HPDC and the first reset control line RL1 corresponding to the next driving circuit row HPDC are the same reset control line RL, and the second initial voltage line Vinit2L corresponding to the previous driving circuit row HPDC and the first initial voltage line VInit1L corresponding to the next driving circuit row HPDC are the same initial voltage line VinitL.

In an embodiment of the present disclosure, the pixel driving circuit PDC may further include a threshold compensation transistor T2, and the threshold compensation transistor T2 compensates the threshold voltage of the driving transistor T3 such that the driving current output by the driving transistor T3 is independent of the threshold voltage of the driving transistor T3, which can eliminate the uneven brightness of the display panel PNL caused by the spatially uneven performance of the driving transistor T3. In an example, a source electrode T2S of the threshold compensation transistor is electrically connected to the drain electrode T3D (as the third node N3) of the driving transistor, a drain electrode T2D of the threshold compensation transistor is electrically connected to the first node N1, and a gate electrode T2G of the threshold compensation transistor is electrically connected to the scanning line GL. The drain electrode T4D of the data writing transistor is electrically connected to the source electrode T3S (as the second node N2) of the driving transistor. The pixel driving circuit PDC may also be provided with a second light-emitting control transistor T5, a source electrode T5S of the second light-emitting control transistor is configured to be applied with the driving power VDD, a drain electrode T5D of the second light-emitting control transistor is electrically connected to the second node N2, and a gate electrode T5G of the second light-emitting control transistor is electrically connected to the first enable signal line EMLA. In this way, when the signal on the scanning line GL causes the threshold compensation transistor T2 and the data writing transistor T4 to be turned on, the voltage written in the first node N1 is related to the driving data Data and the threshold voltage of the driving transistor T3, thereby realizing the threshold compensation for the data writing and the driving transistor T3. This ultimately causes the driving current output from the driving transistor T3 to be related to the written driving data Data and be independent of the threshold voltage of the driving transistor T3.

Of course, in other embodiments of the present disclosure, the threshold compensation transistor T2 and the data writing transistor T4 may not respond to the same signal, for example, one of them responds to a high level signal and the other one responds to a level signal, as long as the threshold compensation transistor T2 and the data writing transistor T4 can be turned on at the same time in some time periods and be turned off at the same time in other time periods. Accordingly, the gate electrode T2G of the threshold compensation transistor and the gate electrode T4G of the data writing transistor are connected to different lines.

It is to be understood that the above description of at least some of the row lines is only exemplary. In order to drive the light-emitting element DD and apply signals to the pixel driving circuit PDC, the display panel PNL may be provided with only a portion of the above-described row lines, or new row lines may be additionally provided as required.

The following will further explain and illustrate the pixel driving circuit PDC, a portion of the lines, and a portion of the DL of the display panel PNL of the present disclosure by taking the pixel driving circuit PDC of a 7-capacitance reset transistor TIC as an example.

The example pixel driving circuit PDC includes the storage capacitor Cst, the capacitance reset transistor T1, the threshold compensation transistor T2, the driving transistor T3, the data writing transistor T4, the second light-emitting control transistor T5, the first light-emitting control transistor T6, and the electrode reset transistor T7. The drain electrode T2D of the threshold compensation transistor, the gate electrode T3G of the driving transistor, and a first electrode plate CP1 of the storage capacitor are electrically connected to the first node N1, the source electrode T3S of the driving transistor, the drain electrode T5D of the second light-emitting control transistor, and the drain electrode T4D of the data writing transistor are electrically connected to the second node N2, the drain electrode T3D of the driving transistor, the source electrode T2S of the threshold compensating transistor, the source electrode T6S of the first light-emitting control transistor are electrically connected to the third node N3, and the drain electrode T4D of the data writing transistor is electrically connected to a second electrode plate CP2 of the storage capacitor. The source electrode TIS of the capacitance reset transistor is configured to be applied with the first initial voltage, the gate electrode T1G of the capacitance reset transistor is configured to be applied with the first reset signal, the gate electrode T2G of the threshold compensation transistor is configured to be applied with the scanning signal Gate, the source electrode T4S of the data writing transistor is configured to be applied with the driving data Data, the gate electrode T4G of the data writing transistor is configured to be applied with the scanning signal Gate, the source electrode T5S of the second light-emitting control transistor is configured to be applied with the driving power VDD, the gate electrode T5G of the second light-emitting control transistor and the gate electrode T6G of the first light-emitting control transistor are configured to be applied with the first level signal, the gate electrode T7G of the electrode reset transistor is configured to be applied with the second reset signal, and the source electrode T7S of the electrode reset transistor is configured to be applied with the second initial voltage. The drain electrode T6D of the first light-emitting control transistor and the drain electrode T7D of the electrode reset transistor are electrically connected to the pixel electrode of the light-emitting element DD.

In an example, the row line corresponding to the driving circuit row HPDC includes the first enable signal line EMLA for applying the enable signal EM, the scanning line GL for applying the scanning signal Gate, the first reset control line RL1 for applying the first reset signal, the second reset control line RL2 for applying the second reset signal, the first initial voltage line VInit1L for applying the first initial voltage, and the second initial voltage line Vinit2L for applying the second initial voltage. Among the row lines corresponding to two adjacent driving circuit rows HPDC, the second reset control line RL2 corresponding to the previous driving circuit row HPDC and the first reset control line RL1 corresponding to the next driving circuit row HPDC are the same reset control line RL, and the second initial voltage line Vinit2L corresponding to the previous driving circuit row HPDC and the first initial voltage line VInit1L corresponding to the next driving circuit row HPDC are the same initial voltage line VinitL.

Figure 11:
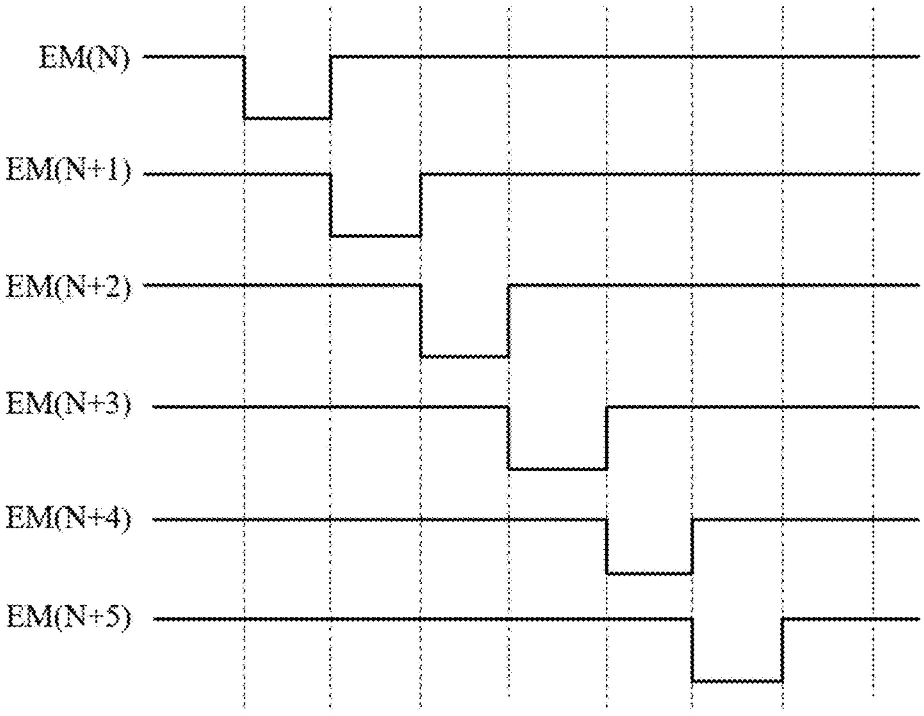
FIG. 11 is a timing diagram of an enable signal in an embodiment of the present disclosure.

In an example, the pixel driving circuit PDC may be turned on when the enable signal EM is a low level signal, and the optical detection driving circuit MDC may be turned on when the enable signal EM is a high level signal. Each row partition HHA includes a plurality of driving circuit rows HPDC, and the driving circuit rows HPDC in each row partition HHA are controlled by the same enable signal EM. Referring to FIG. 11, among a plurality of row partitions HHA that are sequentially adjacent to each other, the enable signals EM of the respective row partitions HHA may be low level signals sequentially to cause the pixel driving circuits PDC in the respective row partitions HHA to be turned on sequentially. In the example of FIG. 11, the enable signal EM (N) represents the enable signal EM in the $N^{th}$ row partition HHA, the enable signal EM (N+1) represents the enable signal EM in the $(N+1)^{th}$ row partition HHA, and so on, the enable signal EM (N+5) represents the enable signal EM in the $(N+5)^{th}$ row partition HHA.

Figure 4:
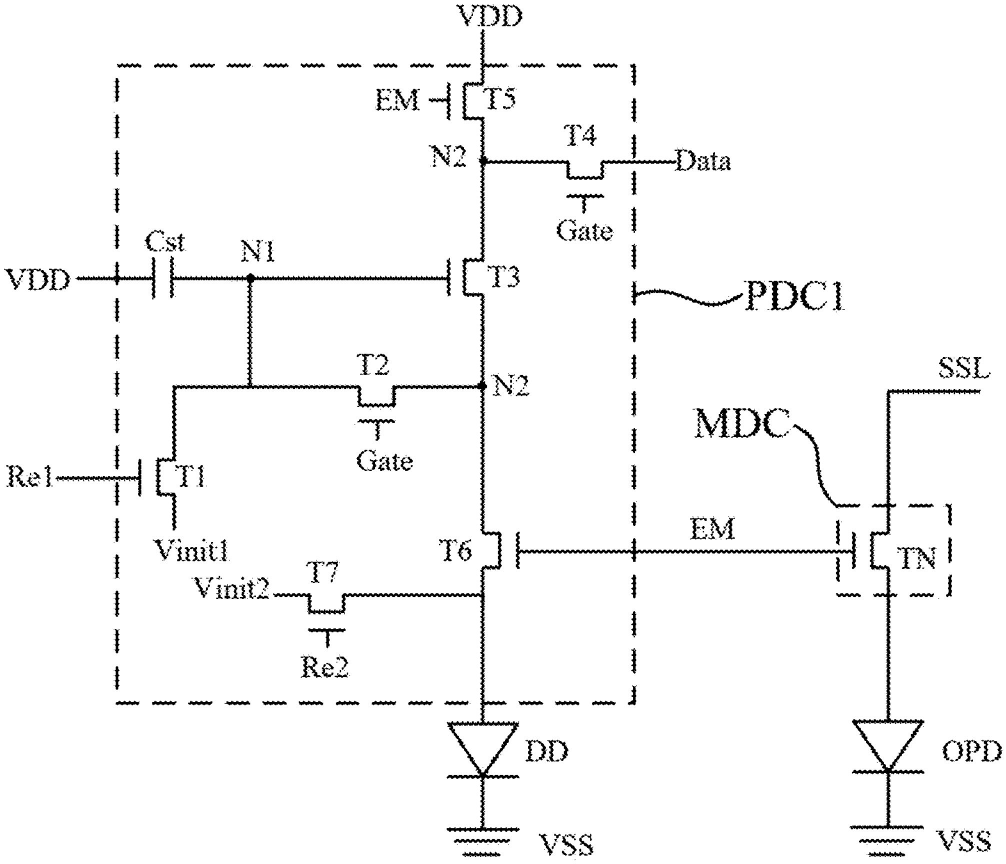
FIG. 4 is a schematic diagram of a structure of a composite driving circuit in an embodiment of the present disclosure.

In some embodiments of the present disclosure, referring to FIGS. 3 and 4, the optical detection driving circuit MDC may include the output control transistor TN, and the photodetector OPD is electrically connected to the output terminal of the optical detection driving circuit MDC through the output control transistor TN, for example, the photodetector OPD is electrically connected to the sense signal line SSL through the output control transistor TN. Further, in the composite driving circuit XDC, the gate electrode TNG of the output control transistor and the gate electrode T6G of the first light-emitting control transistor are configured to be applied with the same signal. The gate electrode T6G of the first light-emitting control transistor and the gate electrode TNG of the output control transistor are configured to be applied with the same enable signal EM, one of the first light-emitting control transistor T6 and the output control transistor TN is configured to be turned on in response to a high level signal of the enable signal EM, and the other one is configured to be turned on in response to a low level signal of the enable signal EM. Specifically, the output control transistor TN can be turned on in response to a second level signal applied on the gate electrode TNG of the output control transistor and can be turned off in response to a first level signal applied on the gate electrode TNG of the output control transistor, and the first light-emitting control transistor T6 can be turned on in response to the first level signal applied on the gate electrode T6G of the first light-emitting control transistor and can be turned off in response to the second level signal applied on the gate electrode T6G of the first light-emitting control transistor. One of the first level signal and the second level signal is the high level signal of the enable signal EM, and the other one is the low level signal of the enable signal EM. Since the gate electrode TNG of the output control transistor and the gate electrode T6G of the first light-emitting control transistor are applied with the same enable signal EM, the output control transistor TN and the first light-emitting control transistor T6 in the composite driving circuit XDC are selected to be turned on.

In an example, referring to FIGS. 4 to 8, the row line of the display panel PNL may further include the second enable signal line EMLB extending along the row direction DH, and the gate electrode TNG of the output control transistor is electrically connected to the second enable signal line EMLB. The first enable signal line EMLA for driving the first pixel driving circuit PDC1 of the composite driving circuit XDC and the second enable signal line EMLB for driving the optical detection driving circuit MDC of the composite driving circuit XDC may be electrically connected to each other so that they are applied with the same enable signal EM.

In an example, the first enable signal lines EMLA and the second enable signal lines EMLB in the same row partition HHA may be electrically connected to each other to ensure that the enable signals EML in the same row partition HHA are applied with the same enable signal EM.

In an example, the driving transistor T3 and the first light-emitting control transistor T6 are P-type transistors, and the output control transistor TN is a metal-oxide semiconductor transistor. In this way, the first level signal is a low level signal and the second level signal is a high level signal. Further, the driving transistor T3 and the first light-emitting control transistor T6 are low temperature polysilicon transistors.

In some embodiments of the present disclosure, referring to FIGS. 5 to 8, the display panel PNL may be divided into a plurality of row partitions HHA sequentially arranged along the column direction DV, and each row partition HHA includes one driving circuit row HPDC or a plurality of adjacent driving circuit rows HPDC. In some embodiments of the present disclosure, the enable signal lines EML in the same row partition HHA may be electrically connected to each other so that the enable signal lines EML in the same row partition HHA are applied with the same enable signal EM. Accordingly, the timings of the applied enable signals EM are different in two adjacent row partitions HHA.

In an example, in the plurality of row partitions HHA sequentially arranged along the column direction DV, the enable signals EM in the respective row partitions HHA are modulated one by one to the first level signal (e.g., the low level signal), i.e., the enable signal lines EML of the respective row partitions HHA may be applied one by one with the first level signal. When the enable signal EM in the row partition HHA is the first level signal, the pixel driving circuit PDC in the row partition HHA drives the light-emitting element DD to emit light and the optical detection driving circuit MDC in the row partition HHA is electrically disconnected. When the enable signal EM in the row partition HHA is not the first level signal, the enable signal EM may be the second level signal, the pixel driving circuit PDC in the row partition HHA does not drive the light-emitting element DD to emit light and the optical detection driving circuit MDC in the row partition HHA is electrically connected.

In an embodiment, the light-emitting element DD driven by the pixel driving circuit PDC in the row partition HHA may be provided in the row partition HHA, and the photodetector OPD driven by the optical detection driving circuit MDC in the row partition HHA may be provided in a different row partition HHA from the optical detection driving circuit MDC, for example, the optical detection driving circuit MDC and the photodetector OPD are provided in two adjacent row partitions HHA. In this manner, when the enable signal EM in one selected row partition HHA is the first level signal, the pixel driving circuit PDC in the selected row partition HHA may drive the light-emitting element DD to emit light, and the photodetector OPD in the selected row partition HHA may generate a detection signal by using these light-emitting elements DD emitting light as a light source. As for the row partitions HHA other than the selected row partition HHA, the enable signal EM in the row partition HHA adjacent to the selected row partition HHA is the second level signal which causes the optical detection driving circuit MDC therein to be turned on. At this time, the photodetector OPD in the selected row partition HHA generates a signal under the illumination of a light source, and the photodetector OPD in the selected row partition HHA is located in another row partition HHA and thus can output such signal, so that the signal generated by the photodetector OPD can be applied onto the sense signal line SSL.

Further, the photodetector OPD may be provided in a gap between the light-emitting elements DD, which does not occupy the space of the light-emitting elements DD and thus does not affect the opening rate of the display panel PNL.

In an embodiment of the present disclosure, the display panel PNL may also be provided with a power row line EMLC extending along the row direction DH. If the driving circuit row HPDC does not have the first pixel driving circuit PDC1 and does not need to be provided with the second enable signal line EMLB for driving the optical detection driving circuit MDC, such driving circuit row HPDC may be provided with the power row line EMLC. The power row line EMLC may be electrically connected to at least a portion of the driving power lines VDDL overlapped therewith, for example, may be electrically connected to each of the driving power lines VDDL overlapped therewith. Therefore, on the one hand, the power row line EMLC and the second enable signal line EMLB are not provided in the space occupied by the same driving circuit row HPDC, so that the display panel PNL does not suffer from a decrease in yield due to too many wirings; and on the other hand, the power row line EMLC can electrically connect the driving power lines VDDL to each other, which in turn can achieve the grid distribution of the driving power VDD and improve the uniformity of the driving power supply VDD, thereby facilitating the uniformity of the display panel PNL.

In an example, the position and shape of the power row line EMLC in the driving circuit row HPDC are consistent with the position and shape of the second enable signal line EMLB in the driving circuit line HPDC, and the power row line EMLC and the second enable signal line EMLB are provided in the same layer, which, on the one hand, facilitates the design and preparation of the power line EMLC and the second enable signal line EMLB are easy, and on the other hand, may improve the homogeneity of the patterning process in preparing the power line EMLC and the second enable signal line EMLB.

In an embodiment of the present disclosure, the output control transistor TN may include a single transistor or a plurality of sub-transistors connected in series. For example, the output control transistor TN includes two sub-transistors connected in series, each sub-transistor has a source electrode, a drain electrode and a gate electrode, and the source electrode of one sub-transistor is electrically connected to the drain electrode of the other sub-transistor. In this way, the leakage of the output control transistor TN may be reduced, the crosstalk between signals of different photodetectors OPD may be avoided, and thus the accuracy of the photodetector OPD may be improved.

In an example, the photodetectors OPD respectively driven by the optical detection driving circuits MDC in the same row partition HHA may be provided in the same row partition HHA. In this way, the optical detection driving circuits MDC in the same row partition HHA and the photodetectors OPD driven by the same may operate synchronously, which may reduce the difficulty of processing the light detection signal.

Referring to FIGS. 5 to 8, in an embodiment of the present disclosure, the driving circuit row HPDC in which the composite driving circuit XDC is provided may be defined as the second driving circuit row HPDCB, and the driving circuit row HPDC in which the composite driving circuit XDC is not provided may be defined as the first driving circuit row HPDCA. Among the plurality of driving circuit rows HPDC in a single row partition HHA, only one second driving circuit row HPDCB may be provided, or a plurality of second driving circuit rows HPDCB may be provided, or no second driving circuit row HPDCB may be provided. For example, in the example of FIG. 5, each row partition HHA includes two driving circuit rows HPDC, one of which is the first driving circuit row HPDCA and the other of which is the second driving circuit row HPDCB. For example, in the example of FIG. 8, one row partition HHA includes two driving circuit rows HPDC, both of which are the second driving circuit rows HPDCB. For another example, in the example of FIG. 10, each row partition HHA has two driving circuit rows HPDC, the driving circuit rows HPDC in some of the row partitions HHA are all the first driving circuit rows HPDCA, i.e., do not include the composite driving circuit XDC; and the driving circuit rows HPDC in some of the row partitions HHA include the second driving circuit row HPDCB, i.e., has the composite driving circuit XDC. More specifically, in the example of FIG. 10, as for two adjacent row partitions HHA, one of the two row partitions HHA does not include the composite driving circuit XDC, and the other one of the two row partitions HHA does not include the second pixel driving circuit PDC2, i.e., only include the composite driving circuit XDC. In this way, the resolution of the photodetectors OPD in the column direction DV may be adjusted by adjusting the number and density of the second driving circuit rows HPDCB.

In an embodiment of the present disclosure, a plurality of composite driving circuits XDC are provided in the same column in at least one row partition HHA, and the plurality of composite driving circuits XDC are electrically connected to different sense signal lines SSL respectively. In other words, if the second driving circuit column VPDCB has a plurality of composite driving circuits XDC in the at least one row partition HHA, the column line group corresponding to the second driving circuit column VPDCB is provided with a plurality of sensing signal lines SSL corresponding to the plurality of composite driving circuits XDC respectively, so that the plurality of composite driving circuits XDC provided in the same column in the same row partition HHA are electrically connected with different sense signal lines SSL. For example, in the example of FIG. 10, the second driving circuit column VPDCB has two composite driving circuits XDC in at least one row partition HHA, the column line group corresponding to the second driving circuit column VPDCB is provided with two sense signal lines SSLs, and the two composite driving circuits XDC provided in the same column in the row partition HHA are electrically connected to the two sense signal lines SSL respectively. In this way, when the composite driving circuits XDC in the row partition HHA are all turned on in response to the second level signal, the signals of the photodetectors OPD driven by the respective composite driving circuits XDC may be respectively output to the different sense signal lines SSL, which avoids the resolution reduction resulting from the merging of the signals of the photodetectors OPD.

Figure 12:
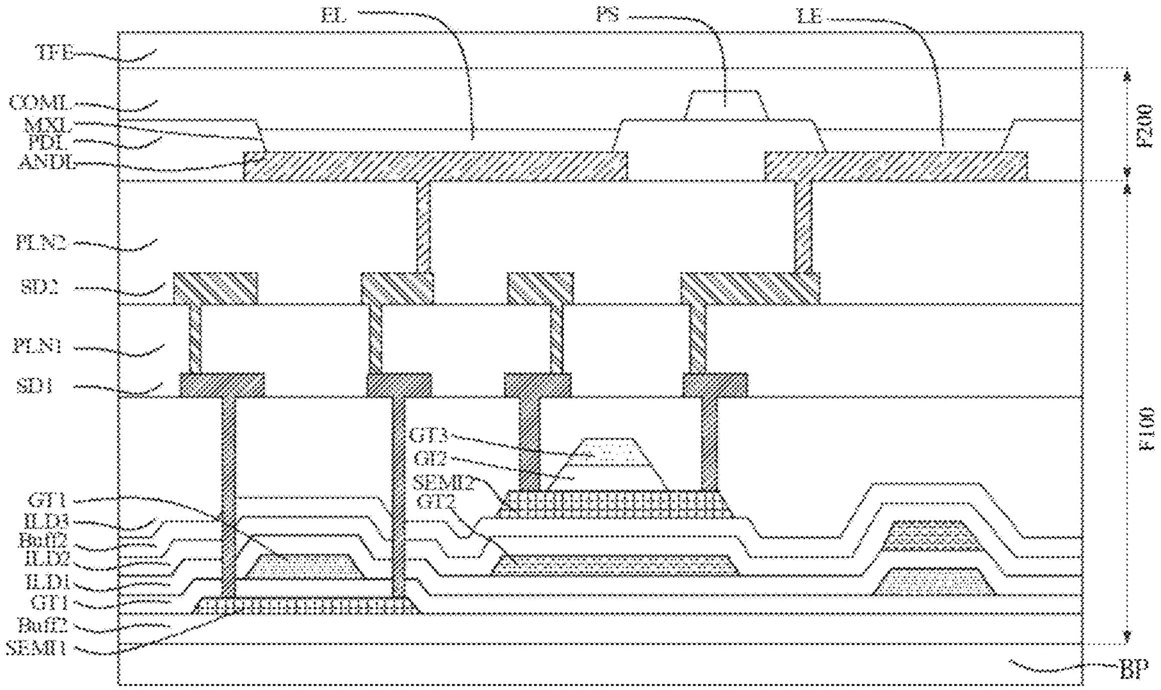
FIG. 12 is a schematic diagram of a structure of a display panel in an embodiment of the present disclosure.

Referring to FIG. 12, in an embodiment of the present disclosure, the display panel PNL may include a base substrate BP, a driving layer F100, and a device layer F200, which are sequentially stacked. The driving layer F100 is provided with the pixel driving circuit PDC for driving the light-emitting element DD and the optical detection driving circuit MDC for driving the photodetector OPD. The light-emitting element DD and the photodetector OPD are provided in the device layer thereof. In an example, the photodetector OPD is provided in a gap between two adjacent light-emitting elements DD and uses light emitted from the adjacent light-emitting element DD as a light source.

In some embodiments of the present disclosure, the base substrate BP may be formed of an inorganic material or an organic material. For example, in an embodiment of the present disclosure, the material of the base substrate BP may be a glass material, such as soda-lime glass, quartz glass, sapphire glass, or the like, or may be a metal material, such as a stainless steel, aluminium, nickel, or the like. In another embodiment of the present disclosure, the material of the base substrate BP may be a polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN), or combinations thereof. In another embodiment of the present disclosure, the base substrate BP may also be flexible, e.g., the material of the base substrate BP may be polyimide (polyimide, PI). The base substrate BP may also be a composite of a plurality of material layers, for example, in an embodiment of the present disclosure, the base substrate BP may include a bottom film layer, a pressure-sensitive adhesive layer, a first polyimide layer, and a second polyimide layer, which are stacked sequentially.

In an embodiment of the present disclosure, in the driving layer F100, any one of the pixel driving circuit PDC and the optical detection driving circuit MDC may include a transistor, and the pixel driving circuit PDC may further include a storage capacitor. Further, the transistor may be a thin-film transistor, and the thin-film transistor may be selected from a top-gate-type thin-film transistor, a bottom-gate-type thin-film transistor, or a double-gate-type thin-film transistor, the material of the active layer of the thin-film transistor may be an amorphous silicon semiconductor material, a low-temperature polysilicon semiconductor material, a metal-oxide semiconductor material, an organic semiconductor material, or other types of semiconductor materials, and the thin-film transistor may be an N-type thin film transistor or a P-type thin film transistor.

It is to be understood that any two of the transistors in the pixel driving circuit may be of the same or different types. For example, in an embodiment, in one pixel driving circuit, some of the transistors may be N-type transistors and some of the transistors may be P-type transistors. For another example, in another embodiment of the present disclosure, in one pixel driving circuit, the materials of the active layers of some of the transistors may be a low-temperature polysilicon semiconductor material, and the materials of the active layers of some of the transistors may be a metal-oxide semiconductor material. In some embodiments of the present disclosure, the thin film transistor is a low temperature polysilicon transistor. In some other embodiments of the present disclosure, some of the thin film transistors are low temperature polysilicon transistors, and some of the thin film transistors are metal-oxide transistors.

In an embodiment, the driving layer F100 may include at least two semiconductor layers and a plurality of conductive metal layers stacked between the base substrate BP and the device layer, and an insulating layer may be provided between the film layers such as the semiconductor layers, the conductive metal layers and the like. The semiconductor layer may form a channel region of a transistor and a source electrode and a drain electrode connected to the channel region, the conductive metal layer may form a gate electrode of the transistor and an electrode plate of a storage capacitor, and the conductive metal layer may also electrically connect the transistor, the storage capacitor, and the like to form the pixel driving circuit PDC and the optical detection driving circuit MDC. Further, the semiconductor layer may include a low-temperature polysilicon semiconductor layer SEMI1 and a metal-oxide semiconductor layer SEMI2. The conductive metal layer may include a plurality of gate layers (e.g., two or three gate layers) and at least one source-drain metal layer (e.g., one to three source-drain metal layers). The positional relationship of the film layers may be determined based on the film layer structure of the thin film transistor.

In an embodiment of the present disclosure, referring to FIG. 12, the driving layer F100 may include a low-temperature polysilicon semiconductor layer SEMI1, a first gate layer GT1, a second gate layer GT2, a metal-oxide semiconductor layer SEMI2, a third gate layer GT3, a first source-drain metal layer SD1, and a second source-drain metal layer SD2, which are stacked sequentially, and insulating layers are provided between respective ones of these film layers. These insulating layers may be inorganic insulating layers or organic insulating layers.

As an example, referring to FIG. 12, the insulating layer in the driving layer F100 may include a first buffer layer Buff1 provided on the side of the low-temperature polysilicon semiconductor layer SEMI1 near to the base substrate BP, a first gate insulating layer GI1 provided between the low-temperature polysilicon semiconductor layer SEMI1 and the first gate layer GT1, a first interlayer dielectric layer ILD1 provided between the first gate layer GT1 and the second gate layer GT2, a second interlayer dielectric layer ILD2 and a second buffer layer Buff2 provided between the second gate layer GT2 and the metal-oxide semiconductor layer SEMI2, a second gate insulating layer GI2 provided between the metal-oxide semiconductor layer SEMI2 and the third gate layer GT3, a third interlayer dielectric layer ILD3 provided between the first source-drain metal layer SD1 and the third gate layer GT3, a first planarization layer PLN1 provided between the first source-drain metal layer SD1 and the second source-drain metal layer SD2, a second planarization layer PLN2 provided on the side of the second source-drain metal layer SD2 away from the base substrate BP, and the like. The metal-oxide semiconductor layer SEMI2 is provided on the surface of the second buffer layer Buff2. Of course, a passivation layer may be provided on the surface of the first source-drain metal layer SD1 or on the surface of the second source-drain metal layer SD2, as desired.

In an embodiment, the first buffer layer Buff1, the first gate insulating layer GI1, the second gate insulating layer GI2, the first interlayer dielectric layer ILD1, the second interlayer dielectric layer ILD2, the third interlayer dielectric layer ILD3, the second buffer layer Buff2 and the like may be formed of an inorganic insulating material, such as silicon oxide, silicon nitride, or silicon nitride oxide and the like. The second buffer layer Buff2 and the second gate insulating layer GI2 may be specifically formed of silicon oxide to reduce defects on the surface of the metal-oxide semiconductor layer SEMI2. The first planarization layer PLN1, the second planarization layer PNL2 and the like may be formed of an organic insulating material, which may be, for example, a photosensitive resin.

In an embodiment of the present disclosure, the channel region of each transistor of the pixel driving circuit PDC is provided in the low-temperature polysilicon semiconductor layer SEMI1, i.e., each transistor of the pixel driving circuit PDC is a low-temperature polysilicon transistor. Of course, in other embodiments of the present disclosure, some of the transistors of the pixel driving circuit PDC may be low-temperature polysilicon transistors and some of the transistors may be metal-oxide transistors.

In an embodiment of the present disclosure, the device layer F200 includes a pixel electrode layer ANDL, a pixel defining layer PDL, a composite functional material layer MXL, and a common electrode layer COML sequentially stacked on the side of the driving layer away from the base substrate BP. The composite functional material layer MXL includes an electroluminescent material layer EL and a photoelectric conversion material layer LE. The pixel electrode layer includes a pixel electrode of the light-emitting element DD, a device electrode of the photodetector OPD and a device lead. The device electrode of the photodetector OPD is electrically connected to the optical detection driving circuit MDC for driving the photodetector OPD via the device lead. In other words, the device electrode of the photodetector OPD, the device lead, and the pixel electrode of the light-emitting element DD may be provided in the same layer, and the photodetector OPD and the composite driving circuit XDC are electrically connected to each other through the device lead.

Figure 9:
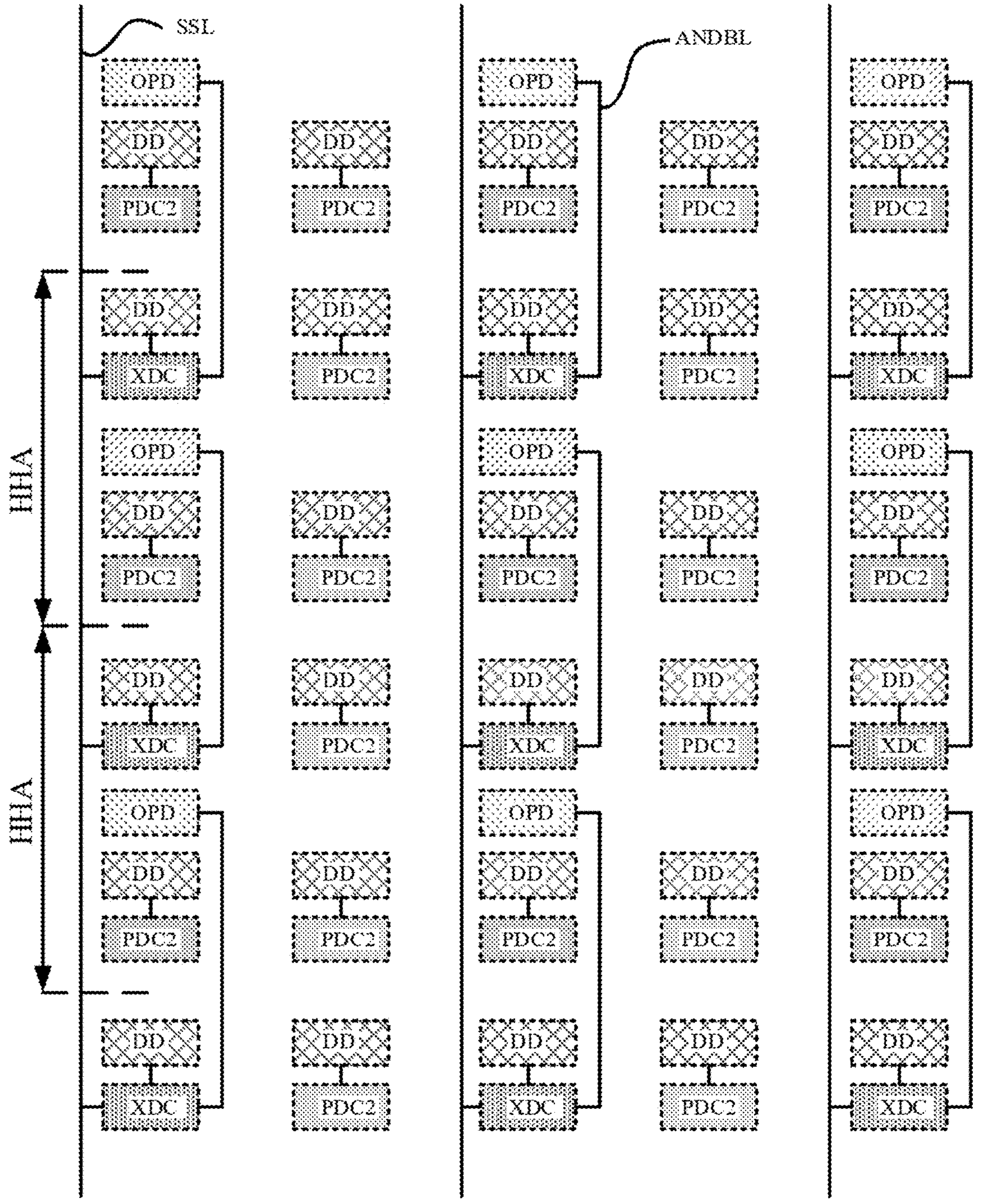
FIG. 9 is a schematic diagram of a distribution of driving circuits, light-emitting elements, and photodetectors in an embodiment of the present disclosure.
Figure 10:
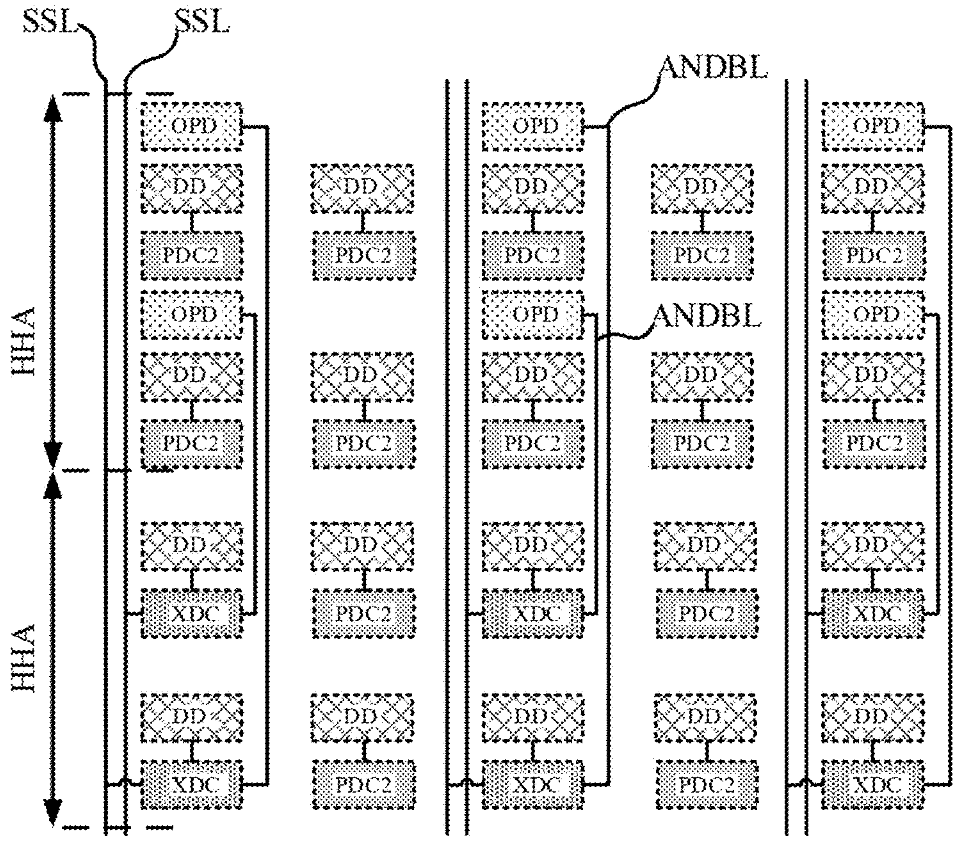
FIG. 10 is a schematic diagram of a distribution of driving circuits, light-emitting elements, and photodetectors in an embodiment of the present disclosure.

For example, referring to FIGS. 9 and 10, there is a device line ANDBL between the photodetector OPD and the composite driving circuit XDC, and the device line ANDBL is provided to cross the row partition HHA, so that the photodetector OPD and the composite driving circuit XDC are provided in different row partitions HHA.

In an embodiment of the present disclosure, referring to FIG. 10, at least one row partition HHA has a plurality of composite driving circuits XDC provided in the same column, the plurality of composite driving circuits XDC are electrically connected, via device lines ANDBL, to respective photodetectors OPD driven thereby, and these device lines ANDBL are all provided on the same side of the composite driving circuits XDC along the row direction DH, for example, are all are provided on the left or right side of the composite driving circuits XDC. In other words, the device lines ANDBL to which the plurality of composite driving circuits XDC provided in the same column in the row partition HHA are connected are all provided at the same side of the composite driving circuits XDC in the row direction DH, which facilitates the wiring arrangement of the device lines ANDBL and reduces crosstalk that may be caused by the device line ANDBL crossing a line.

In an example, the device layer F200 may further have a support pillar layer PS. The support pillar layer PS includes a plurality of support pillars in the display area and the support pillars are provided on the surface of the pixel defining layer PDL away from the base substrate BP in order to support a fine metal mask (FMM) during the vapor deposition process.

In an embodiment of the present disclosure, the electroluminescent material layer covers at least the pixel electrodes exposed by the pixel defining layer PDL. The electroluminescent material layer may include an organic electroluminescent material layer, and may include one or more of a hole-injection layer, a hole-transport layer, an electron-blocking layer, a hole-blocking layer, an electron-transport layer, and an electron-injection layer. Each film layer of the electroluminescent material layer EL of the organic light-emitting functional layer may be prepared by a vapor deposition process, and a fine metal mask or an open mask may be used to define a pattern of each of the film layers during the vapor deposition. The common electrode layer COML may cover the electroluminescent material layer EL of the organic light-emitting functional layer in the display area. In this way, the pixel electrode, the common electrode layer COML, and the electroluminescent material layer provided between the pixel electrode and the common electrode layer COML form an organic electroluminescent diode, and any organic electroluminescent diode may serve as one subpixel of the display panel.

In an embodiment, the device layer may further include a light extracting layer provided on the side of the common electrode layer COML away from the base substrate BP to enhance the light output efficiency of the organic light-emitting diode.

In an embodiment, the display panel may also include a thin film encapsulation layer TFE. The thin film encapsulation layer TFE is provided on a surface of the device layer F200 away from the base substrate BP, and may include an inorganic encapsulation layer and an organic encapsulation layer stacked alternatively. A touch control layer is provided on a side of the thin film encapsulation layer TFE away from the base substrate BP. The inorganic encapsulation layer may effectively block external moisture and oxygen, thereby prevent water and oxygen from invading into the electroluminescent material layer EL of the organic light-emitting functional layer and thus leading to material degradation. In an embodiment, the edge of the inorganic encapsulation layer may be located in the peripheral area. The organic encapsulation layer is provided between two adjacent inorganic encapsulation layers in order to achieve planarization and reduce stresses between the inorganic encapsulation layers. The edge of the organic encapsulation layer may be provided between an edge of the display area and an edge of the inorganic encapsulation layer. For example, the thin film encapsulation layer TFE includes a first inorganic encapsulation layer, an organic encapsulation layer, and a second inorganic encapsulation layer that are sequentially stacked on a side of the device layer away from the base substrate BP.

The structure, wiring manner, and function of the display panel PNL in an embodiment of the present disclosure are further exemplarily described below by taking the pixel driving circuit PDC to be the first pixel driving circuit PDC1 and the optical detection driving circuit MDC to be the output control transistor TN shown in FIG. 4 as an example. In an example, the pixel driving circuit PDC has seven low-temperature polysilicon transistors and one storage capacitor. It is to be understood that in other embodiments of the present disclosure, the number and type of transistors, the number of storage capacitors, the connection manner and the arrangement position between the transistors, and the like in the pixel driving circuit PDC may be different from the present example. In an example, the display panel PNL is provided with circuit arrangement areas PDCA for arranging the pixel driving circuits PDC, and the circuit arrangement areas PDCA each is rectangular and arranged in an array, so that most of the transistors of each of the pixel driving circuits PDC are provided within the circuit arrangement area PDCA. However, some of the transistors of the pixel driving circuit PDC may be provided within the circuit arrangement area PDCA of other pixel driving circuits PDC. Specifically, in an example, the electrode reset transistor T7 of the pixel driving circuit PDC may be provided within the circuit arrangement area PDCA of an adjacent pixel driving circuit PDC in the same column. Accordingly, the electrode reset transistor T7 provided within the circuit arrangement area PDCA of the pixel driving circuit PDC is the electrode reset transistor T7 of an adjacent pixel driving circuit PDC in the same column. According to the type and arrangement of the output control transistor TN, three different examples such as first to third examples are provided.

Referring to FIG. 12, in the display panel PNL according to an example, the driving layer of the display panel PNL includes the first buffer layer Buff1, the low-temperature polysilicon semiconductor layer SEMI1, the first gate insulating layer GI1, the first gate layer GT1, the first interlayer dielectric layer ILD1, the second gate layer GT2, the second interlayer dielectric layer ILD2, the second buffer layer Buff2, the metal-oxide semiconductor layer SEMI2, the second gate insulating layer GI2, the third gate layer GT3, the third interlayer dielectric layer ILD3, the first source-drain metal layer SD1, the first planarization layer PLN1, the second source-drain metal layer SD2, and the second planarization layer PLN2 that are stacked sequentially. The low-temperature polysilicon semiconductor layers SEMI1, the first gate layers GT1, and the second gate layers GT2 of the first to third examples may be the same.

Figure 13:
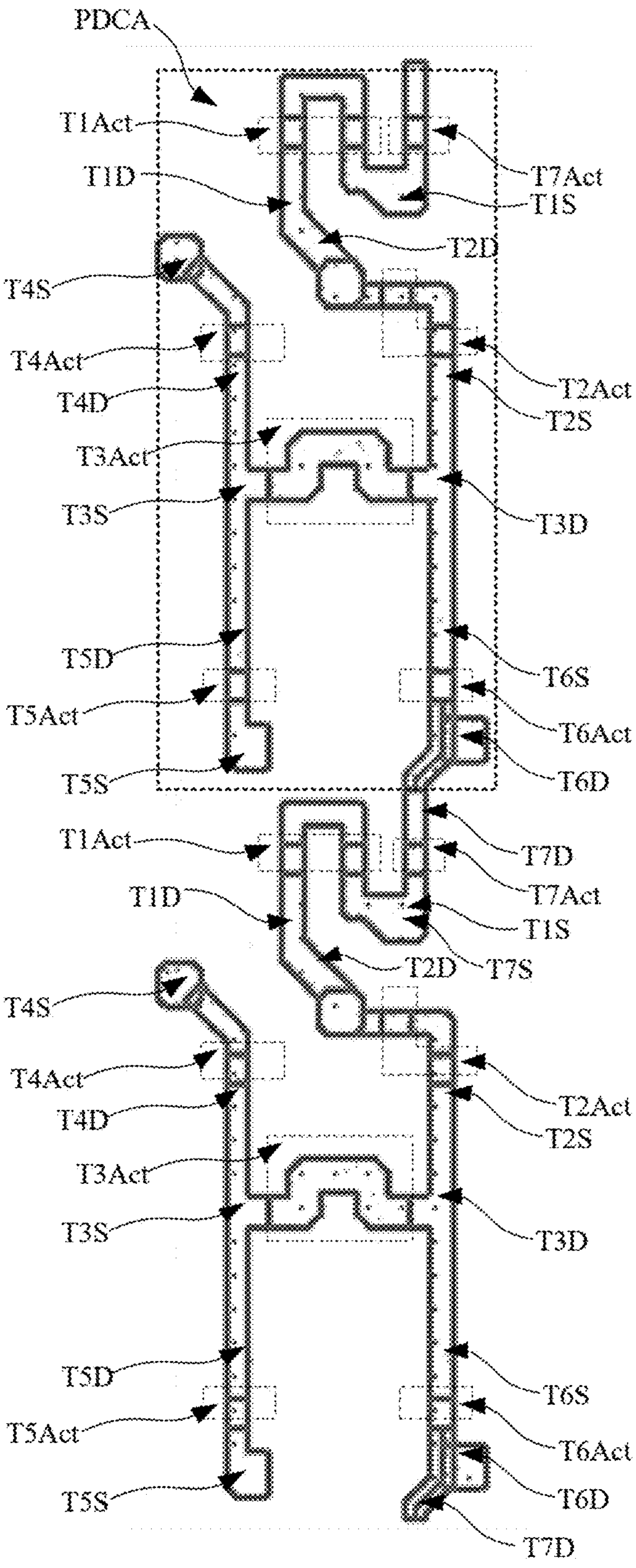
FIG. 13 is a schematic diagram of a structure of a low-temperature polysilicon semiconductor layer in an embodiment of the present disclosure.

FIG. 13 is a schematic diagram of a structure of the low-temperature polysilicon semiconductor layer SEMI1 of the display panel PNL in the three examples. Referring to FIG. 13, the low-temperature polysilicon semiconductor layer SEMI1 may be provided with the channel region T1Act of the capacitance reset transistor, the channel region T2Act of the threshold compensation transistor, the channel region T3Act of the driving transistor, the channel region T4Act of the data writing transistor, the channel region T5Act of the second light-emitting control transistor, the channel region T6Act of the first light-emitting control transistor, the channel area T7Act of the electrode reset transistor that maintain semiconductor characteristics, and be further provided with a conduction-processed connection area. These conduction-processed connection areas may include a source electrode and a drain electrode of each transistor, and the source electrode and the drain electrode of the transistor are connected to both ends of the channel region of the transistor, respectively. The source electrode TIS of the capacitance reset transistor is electrically connected to the initial voltage line VinitL provided in the second gate layer GT2 via a second metal connection structure ML2 provided in the first source-drain metal layer SD1 so as to apply Vinit to the source electrode TIS of the capacitance reset transistor. Referring to FIG. 13, the source electrode TIS of the capacitance reset transistor of the current pixel driving circuit PDC may be connected to the source electrode T7S of the electrode reset transistor in an adjacent pixel driving circuit PDC in the same column. The drain electrode T1D of the capacitance reset transistor is connected to the drain electrode T2D of the threshold compensation transistor and may be electrically connected to the first electrode plate CP1 of the storage capacitor provided in the first gate layer GT1 via a third metal connection structure ML3 provided in the first source-drain metal layer SD1, and the first electrode plate CP1 of the storage capacitor may cover the channel region T3Act of the driving transistor to be multiplexed as the gate electrode T3G of the driving transistor, which allows the drain electrode T1D of the capacitance reset transistor, the drain electrode T2D of the threshold compensation transistor, the first electrode plate CP1 of the storage capacitor, and the third metal connection structure ML3 to be used as a part of the first node N1. The source electrode T2S of the threshold compensation transistor is connected to the drain electrode T3D of the driving transistor and the source electrode T6S of the first light-emitting control transistor to serve as a part of the second node N2. The drain electrode T6D of the first light-emitting control transistor is connected to the drain electrode T7D of the electrode reset transistor and may be electrically connected to a fourth metal connection structure ML4 provided in the first source-drain metal layer SD1 through a via-hole, and the fourth metal connection structure ML4 is used to be electrically connected to the pixel electrode ANDA through a fifth metal connection structure ML5 provided in the second source-drain metal layer SD2. The source electrode T5S of the second light-emitting control transistor is used to be electrically connected to the driving power line VDDL provided in the first source-drain metal layer SD1 through a via-hole, and the drain electrode T5D of the second light-emitting control transistor, the source electrode T3S of the driving transistor, and the drain electrode T4D of the data-writing transistor are electrically connected to act as a part of the third node N3. The source electrode T4S of the data writing transistor is provided at a side of the circuit arrangement area PDCA in the row direction DH and is connected to the channel region T4Act of the data writing transistor, which is used to be electrically connected to the data line DataL provided in the first source-drain metal layer SD1 through a via-hole so as to apply the driving data Data to the source electrode T4S of the data writing transistor.

The channel region T1Act of the capacitance reset transistor may include two channel sub-regions, and the two channel sub-regions are electrically connected to each other by conduction-processed low-temperature polysilicon, so that the capacitance reset transistor T1 is equivalent to two sub-transistors connected in series, which may in turn reduce the leakage of the capacitance reset transistor T1, and thus improve the voltage holding capacity of the storage capacitor Cst. The channel region T2Act of the threshold compensation transistor may include two channel sub-regions, and the two channel sub-regions are electrically connected to each other by conduction-processed low-temperature polysilicon, so that the threshold compensation transistor T2 is equivalent to two sub-transistors connected in series, which may in turn reduce the leakage of the threshold compensation transistor T2, and thus improve the voltage holding capacity of the storage capacitor Cst.

The two channel sub-regions of the capacitance reset transistor T1 and the channel region T7Act of the electrode reset transistor may be provided in the same row, and thus may be overlapped with the reset control line RL provided in the first gate layer GT1, so that a portion of the reset control line RL serves as the gate electrode T1G of the capacitance reset transistor and the gate electrode T7G of the electrode reset transistor at the same time.

The two channel sub-regions of the threshold compensation transistor T2 may be provided perpendicular to each other, and one channel sub-region thereof is provided in the same row as the channel region T4Act of the data writing transistor. The scanning line GL provided in the first gate layer GT1 is overlapped with the channel region T4Act of the data writing transistor so that the overlapped portion thereof serves as the gate electrode T4G of the data writing transistor, and the scanning line GL is overlapped with one channel region of the threshold compensation transistor T2 so that the overlapped portion thereof serves as the gate electrode of one sub-transistor of the threshold compensation transistor T2. The scanning line GL may have a branching portion, and the branching portion is overlapped with another channel region of the threshold compensation transistor T2 so that the overlapped portion thereof serves as the gate electrode of another sub-transistor of the threshold compensation transistor T2.

The channel region T5Act of the second light-emitting control transistor and the channel region T6Act of the first light-emitting control transistor are provided in the same row so that the first enable signal line EMLA provided in the first gate layer GT1 may be simultaneously overlapped with the channel region T5Act of the second light-emitting control transistor and the channel region T6Act of the first light-emitting control transistor. The portion of the first enable signal line EMLA overlapped with the channel region T5Act of the second light-emitting control transistor may be used as the gate electrode T5G of the second light-emitting control transistor, and the portion of the first enable signal line EMLA overlapped with the channel region T6Act of the first light-emitting control transistor may be used as the gate electrode T6G of the first light-emitting control transistor.

Figure 14:
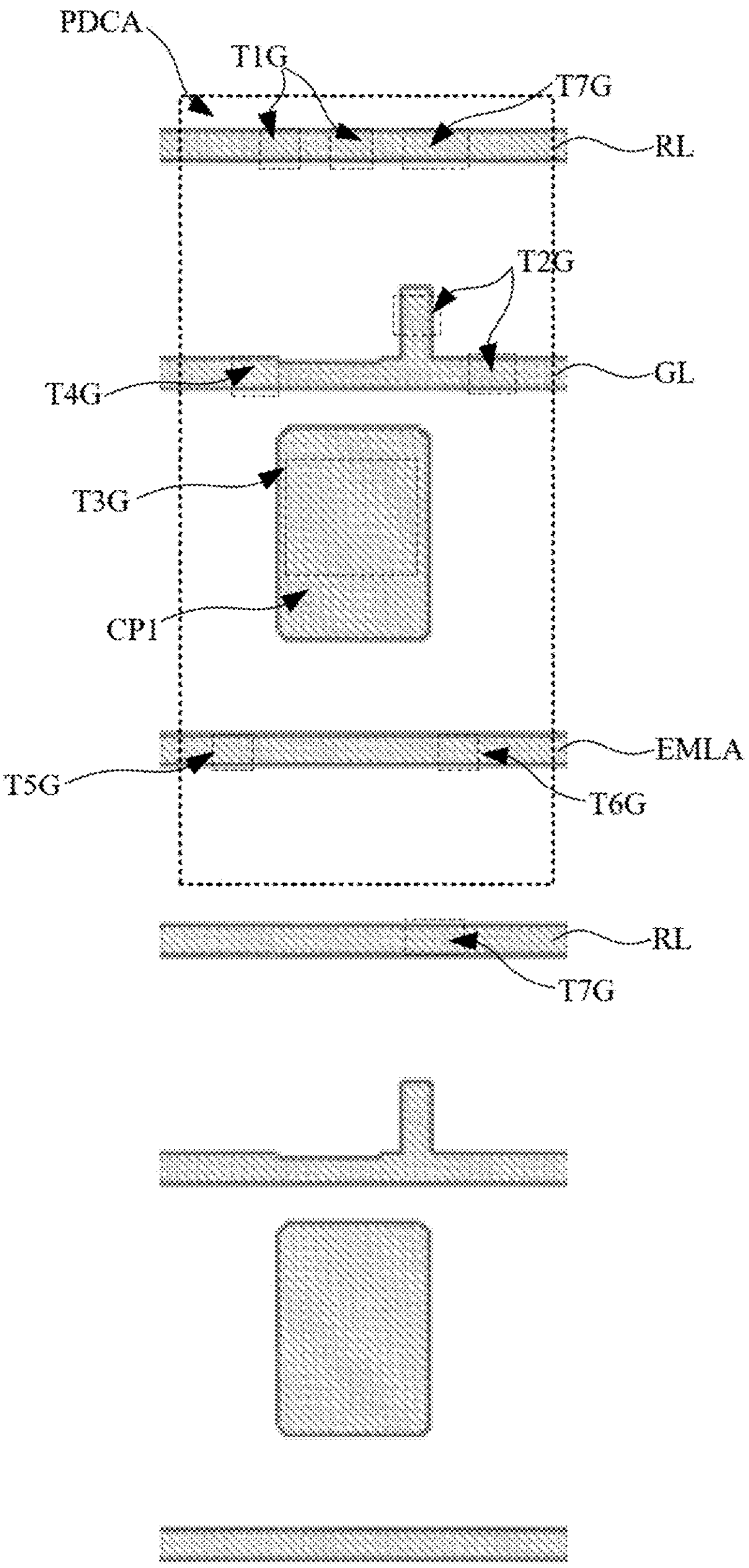
FIG. 14 is a schematic diagram of a structure of a first gate layer in an embodiment of the present disclosure.

FIG. 14 is a schematic diagram of a structure of the first gate layer GT1 of the display panel PNL in the three examples. Referring to FIG. 14, the first gate layer GT1 is provided with the reset control line RL, the scanning line GL and the first enable signal line EMLA which extend along the row direction DH, and is further provided with the first electrode plate CP1 of the storage capacitor. Further, referring to FIG. 14, in the same circuit arrangement area PDCA, the reset control line RL, the scanning line GL, the first electrode plate CP1 of the storage capacitor, and the first enable signal line EMLA are sequentially arranged along the column direction DV.

Figure 15:
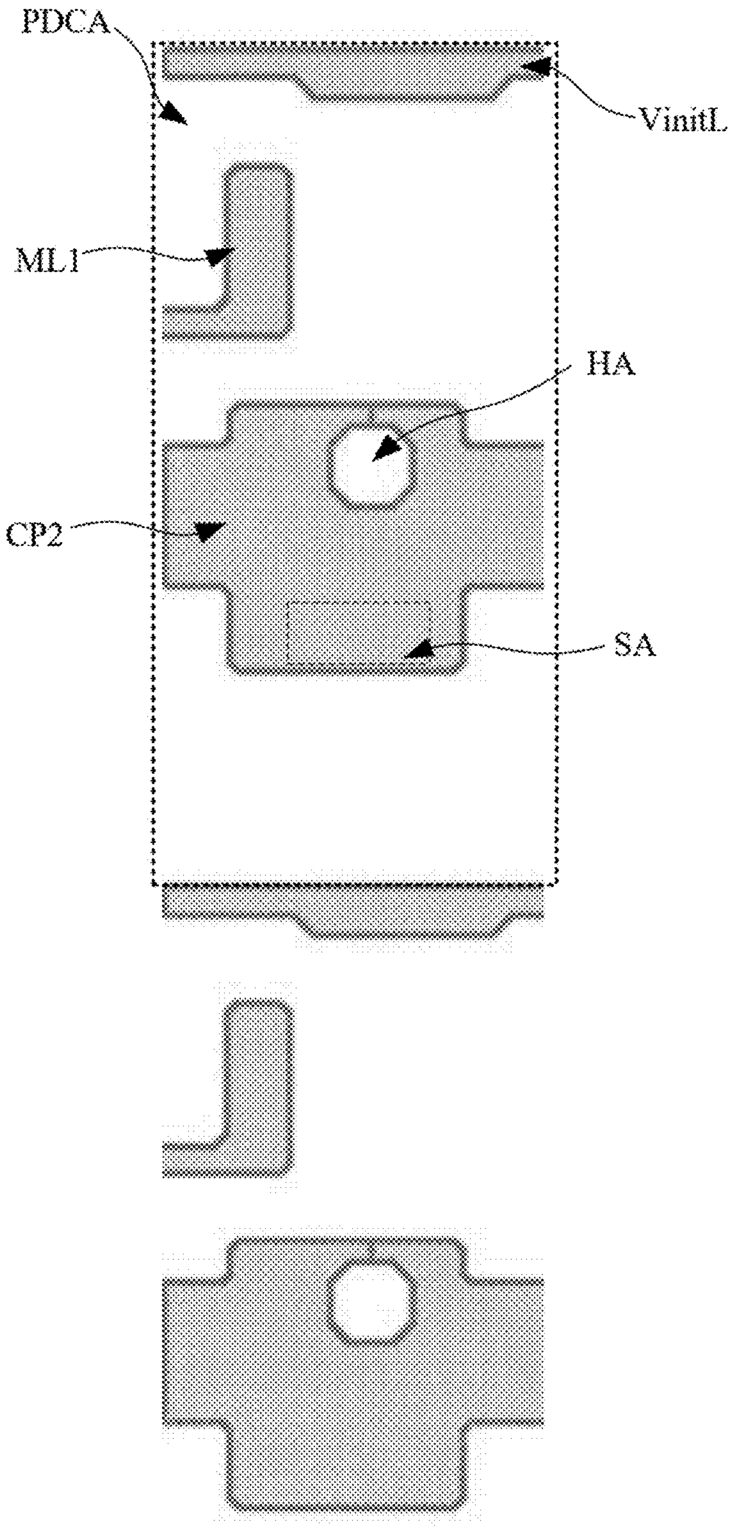
FIG. 15 is a schematic diagram of a structure of a second gate layer in an embodiment of the present disclosure.

FIG. 15 is a schematic diagram of a structure of the second gate layer GT2 of the display panel PNL in the three examples. Referring to FIG. 15, the second gate layer GT2 is provided with the initial voltage line VinitL extending along the row direction DH, and is further provided with the first metal connection structure ML1 and the second electrode plate CP2 of the storage capacitor. The first metal connection structure ML1 is electrically connected to the driving power line VDDL provided in the first source-drain metal layer SD1 and may be partially overlapped with the source electrode T4S of the data writing transistor. In this manner, the first metal connection structure ML1 may stabilize the voltage of the source electrode T4S of the data writing transistor, reduce the crosstalk effect on the pixel driving circuit PDC due to the signal fluctuation on the data line DataL, and thus improve the stability of the pixel driving circuit PDC. The second electrode plate CP2 of the storage capacitor is overlapped with the first electrode plate CP1 of the storage capacitor and is electrically connected to the driving power line VDDL provided in the first source-drain metal layer SD1 through a via-hole. The second electrode plate CP2 of the storage capacitor has an HA exposing the first electrode plate CP1 of the storage capacitor, through which the third metal connection structure ML3 may be electrically connected to the first electrode plate CP1 of the storage capacitor. Further, in the same circuit arrangement area PDCA, the initial voltage line VinitL, the first metal connection structure ML1, and the second electrode plate CP2 of the storage capacitor may be sequentially arranged along the column direction DV.

In an example, the second electrode plates CP2 of the storage capacitors in the adjacent circuit arrangement areas PDCA in the same row may be connected to each other, which in turn allows adjacent driving power lines VDDL to be electrically connected via the second electrode plate CP2 of the storage capacitor. Therefore, the grid distribution of the driving power VDD may be achieved and the homogeneity of the driving power VDD may be improved.

In an example, if the circuit arrangement area PDCA is used for arranging the composite driving circuit XDC, the second electrode plate CP2 of the storage capacitor may also be provided to be overlapped with the channel region TNAct of the output control transistor provided in the metal-oxide semiconductor layer SEMI2, to shield light for the channel region TNAct of the output control transistor. For example, the second electrode plate CP2 of the storage capacitor may have a light-shielding area SA, and an orthographic projection of the channel region TNAct of the output control transistor on the second gate layer GT2 may be located within the light-shielding area SA. Of course, in other examples, the second gate layer GT2 may also be provided with a light-shielding part alone, or the second gate layer GT2 may be provided with the second enable signal line EMLB to drive the output control transistor TN together with the second enable signal line EMLB provided in the third gate layer GT3.

Figure 16:
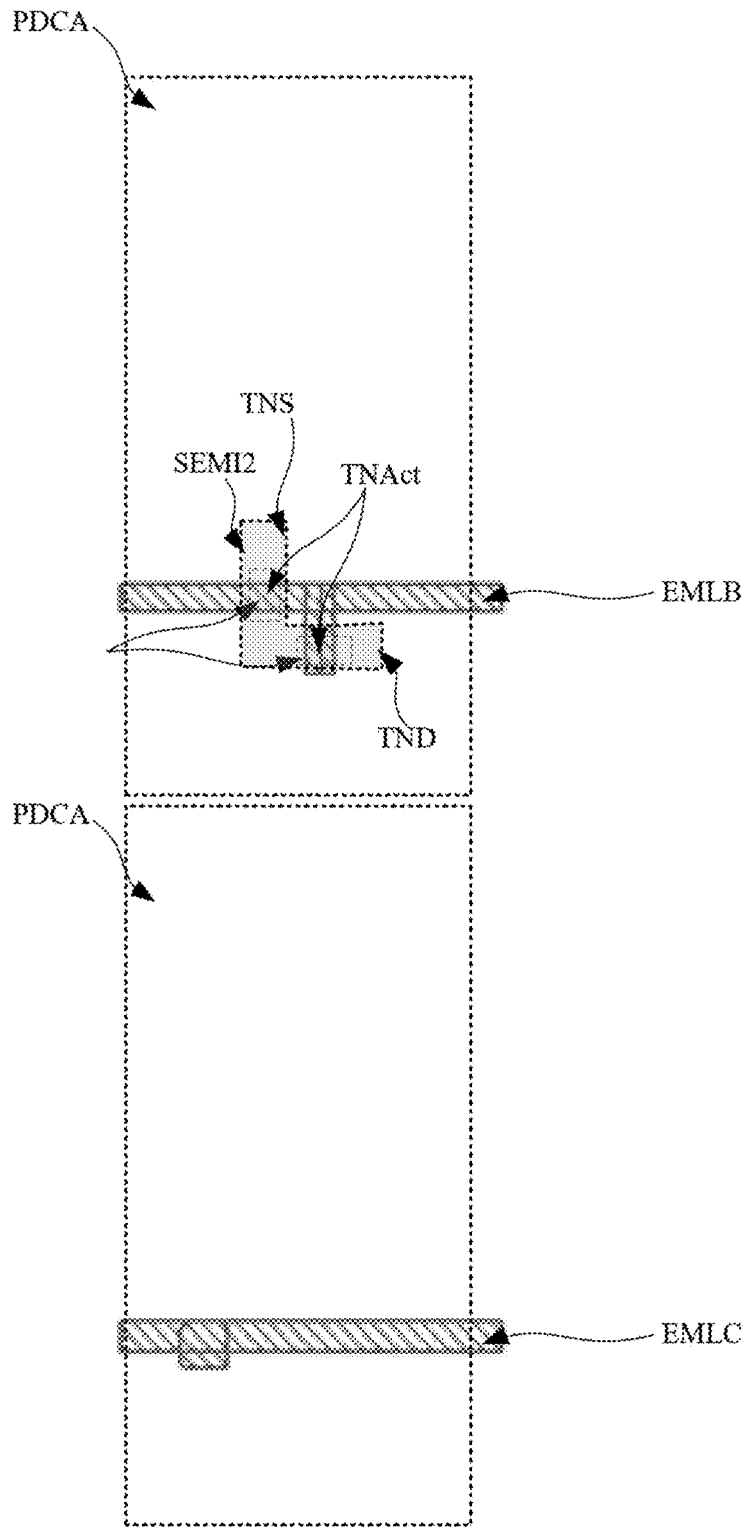
FIG. 16 is a schematic diagram of a structure of a third gate layer in a first example of the present disclosure.

FIG. 16 is a schematic diagram of a structure of the third gate layer GT3 and the metal-oxide semiconductor layer SEMI2 of the display panel PNL in the first example. In the first example, only one driving circuit row HPDC in one row partition HHA is provided with the composite driving circuit XDC, and the output control transistor TN in such composite driving circuit XDC has two channel sub-regions. Referring to FIG. 16, in the first example, the third gate layer GT3 is provided with the second enable signal line EMLB and the power row line EMLC. The second enable signal line EMLB is overlapped with one channel sub-region of the output control transistor TN so that the overlapped portion thereof serves as the gate electrode of one of the sub-transistors of the output control transistor TN. The second enable signal line EMLB has a branching portion, and the branching portion is overlapped with the other channel sub-region of the output control transistor TN so that the overlapped portion thereof serves as the gate electrode of the other sub-transistor of the output control transistor TN. In the driving circuit row HPDC where the composite driving circuit XDC is not provided, the third gate layer GT3 is provided with the power row line EMLC, and the power row line EMLC is used to be electrically connected to the driving power row line VDDL provided in the first source-drain metal layer SD1 to realize further grid distribution of the driving power VDD.

Figure 17:
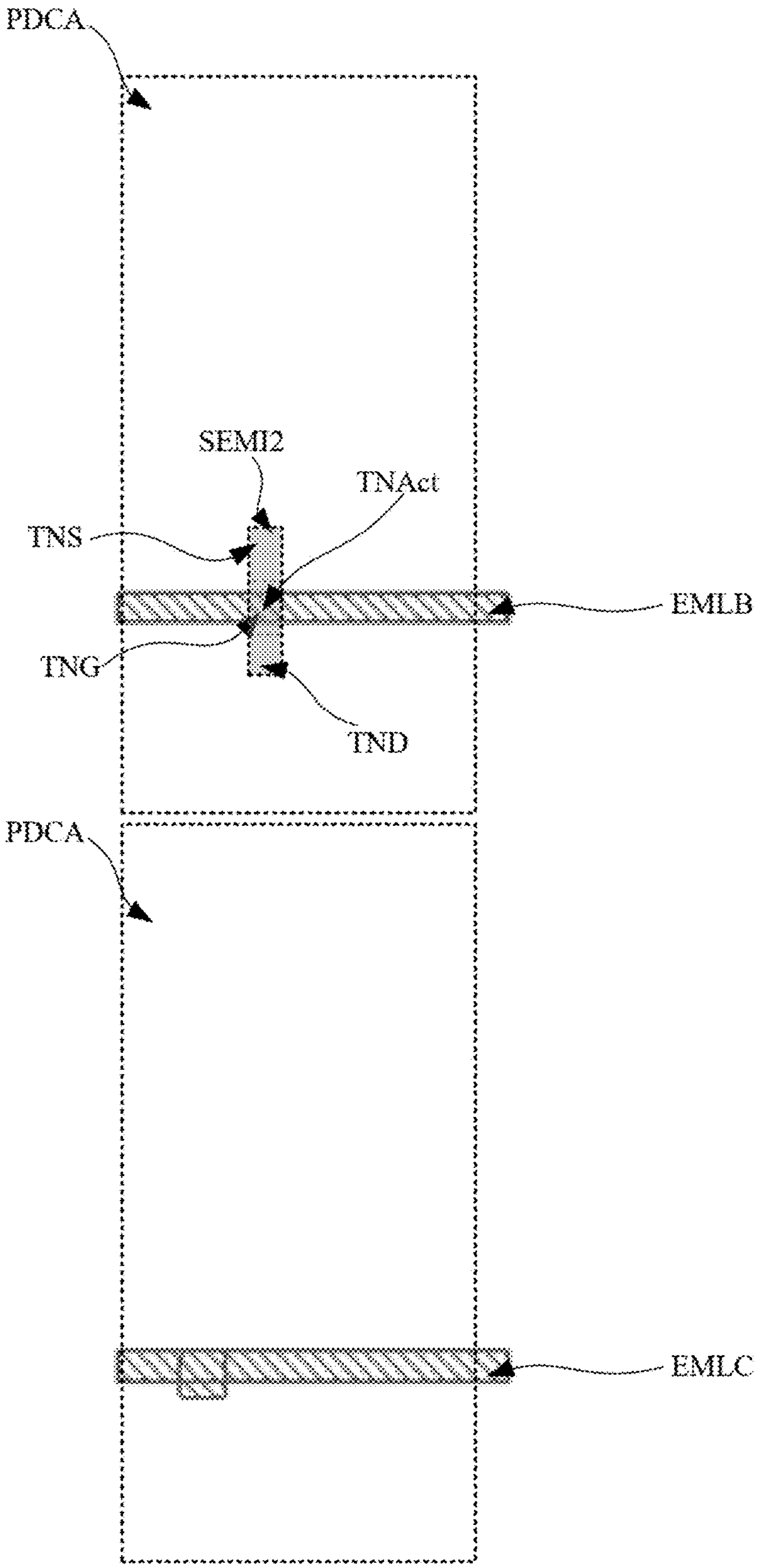
FIG. 17 is a schematic diagram of a structure of a third gate layer in a second example of the present disclosure.

FIG. 17 is a schematic diagram of a structure of the third gate layer GT3 and the metal-oxide semiconductor layer SEMI2 of the display panel PNL in the second example. In the second example, only one driving circuit row HPDC in one row partition HHA is provided with the composite driving circuit XDC, and the output control transistor TN in this composite driving circuit XDC has only one channel region. Referring to FIG. 17, in the second example, the third gate layer GT3 is provided with the second enable signal line EMLB and the power row line EMLC. The second enable signal line EMLB is overlapped with the channel region of the output control transistor TN so that the overlapped portion thereof serves as the gate electrode of the output control transistor TN. In the driving circuit line HPDC where the composite driving circuit XDC is not provided, the third gate layer GT3 is provided with the power row line EMLC, and the power row line EMLC is used to be electrically connected to the driving power row line VDDL provided in the first source-drain metal layer SD1 to realize further grid distribution of the driving power VDD.

Figure 18:
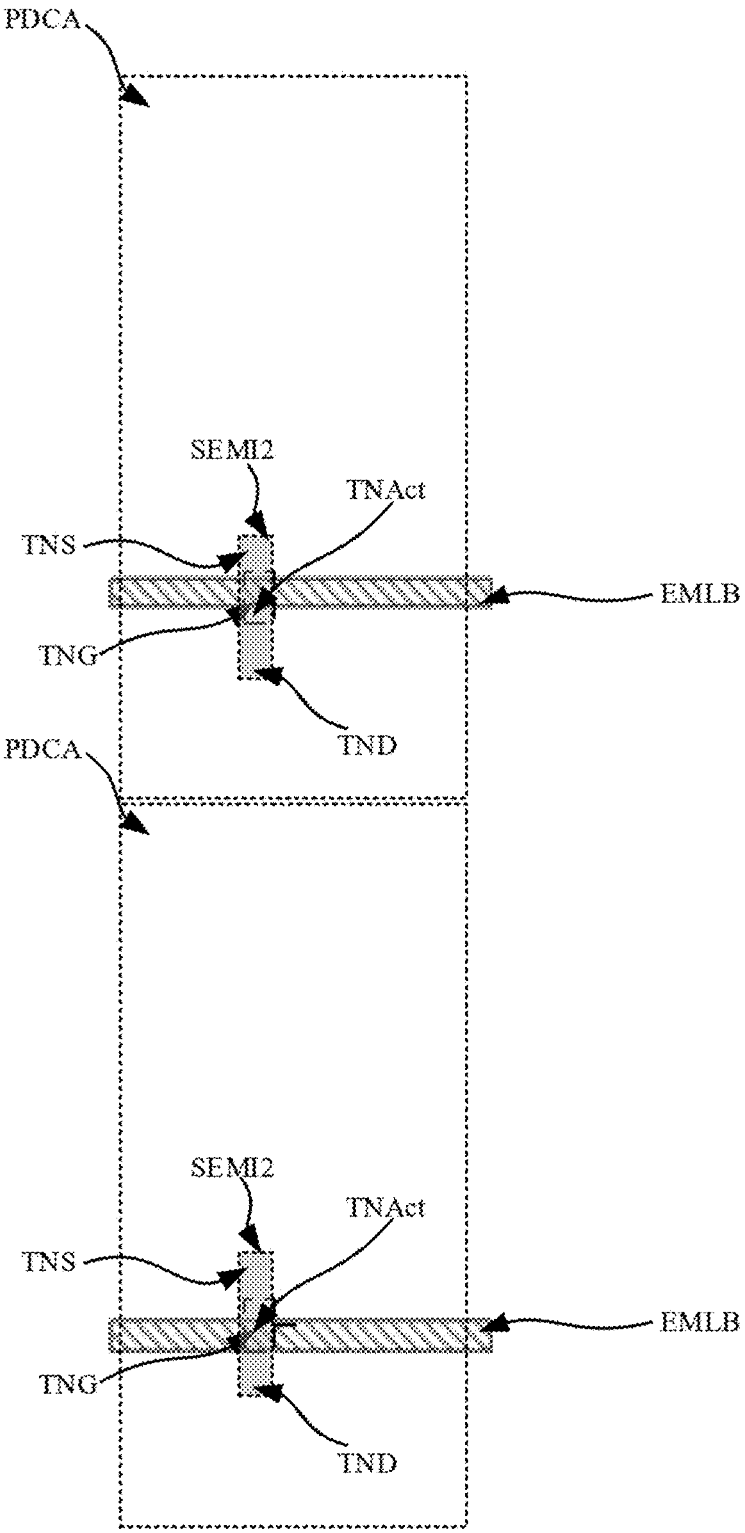
FIG. 18 is a schematic diagram of a structure of a third gate layer in a third example of the present disclosure.

FIG. 18 is a schematic diagram of a structure of the third gate layer GT3 and the metal-oxide semiconductor layer SEMI2 of the display panel PNL in the third example. In the second example, two driving circuit rows HPDC in at least one row partition HHA are provided with the composite driving circuit XDC, and the output control transistor TN in the composite driving circuit XDC has only one channel region. Referring to FIG. 18, in the third example, each of the circuit arrangement areas PDCA corresponding to the two driving circuit rows HPDC is provided with the second enable signal line EMLB, and each of the second enable signal lines EMLB is overlapped with the channel region TNAct of the output control transistor so that the overlapped portion thereof serves as the gate electrode TNG of the output control transistor.

Figure 19:
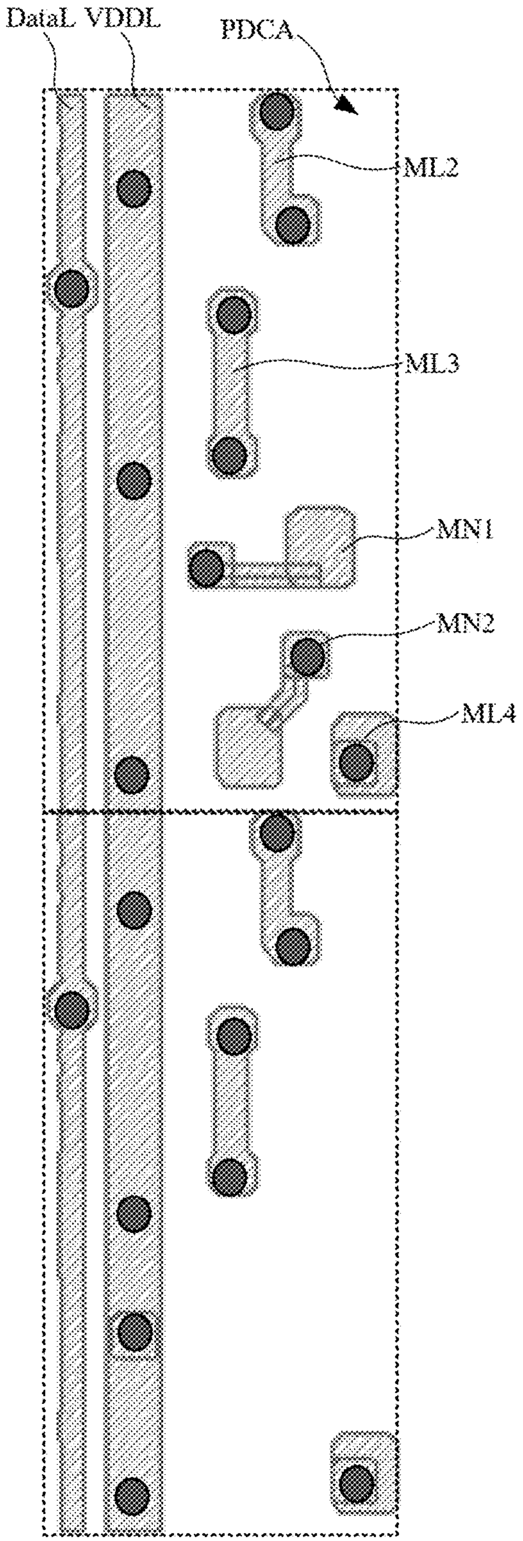
FIG. 19 is a schematic diagram of a structure of a first source-drain metal layer in the first example of the present disclosure.

FIG. 19 is a schematic structure of the first source-drain metal layer SD1 of the display panel PNL in the first example. The circle filled with black indicates the position of a via-hole where the first source-drain metal layer SD1 is connected to each film layer (the low-temperature polysilicon semiconductor layer SEMI1, first gate layer GT1, second gate layer GT2, metal-oxide semiconductor layer SEMI2, third gate layer GT3, and the like) under the first source-drain metal layer SD1 through the via-hole. Referring to FIG. 19, in the first example, the first source-drain metal layer SD1 is provided with the data line DataL and the driving power line VDDL, and the second metal connection structure ML2, the third metal connection structure ML3, and the fourth metal connection structure ML4 are provided in each of the circuit arrangement areas PDCA. In the circuit arrangement area PDCA corresponding to the composite driving circuit XDC, a sixth metal connection structure MN1 and a seventh metal connection structure MN2 are provided. The data line DataL is electrically connected to the source electrode T4S of the data writing transistor through a via-hole. The driving power line VDDL is electrically connected to the first metal connection structure ML1, the source electrode T5S of the second light-emitting control transistor, and the second electrode plate CP2 of the storage capacitor through via-holes. The second metal connection structure ML2 is electrically connected through via-holes to the initial voltage line Vin and the source electrode TIS of the capacitance reset transistor respectively, and is further electrically connected through a via-hole to the source electrode T7S of the electrode reset transistor of the pixel driving circuit PDC in the previous row. The third metal connection structure ML3 is electrically connected to the drain electrode T1D of the capacitance reset transistor, and the drain electrode T2D of the threshold compensation transistor through via-holes. The fourth metal connection structure ML4 is electrically connected to the drain electrode T7D of the electrode reset transistor and the drain electrode T6D of the first light-emitting control transistor through via-holes. The fourth metal connection structure ML4 is also electrically connected through a via-hole to the fifth metal connection structure ML5 provided in the second source-drain metal layer SD2, and the fifth metal connection structure ML5 is electrically connected through a via-hole to the pixel electrode ANDA provided in the pixel electrode layer ANDL, thereby enabling the pixel driving circuit PDC in the circuit arrangement area PDCA to drive the light-emitting element DD. In the first example, the sixth metal connection structure MN1 has two connection parts and a connection line connecting the two connection parts. A first connection part of the sixth metal connection structure MN1 is electrically connected to the drain electrode TND of the output control transistor through a via-hole, and a second connection part of the sixth metal connection structure MN1 is electrically connected through a via-hole to a ninth metal connection structure MN4 provided in the second source-drain metal layer SD2. The ninth metal connection structure MN4 is used to be electrically connected to the device electrode ANDB provided in the pixel electrode layer ANDL through the device line ANDBL. The seventh metal connection structure MN2 has two connection parts and a connection line connecting the two connection parts. A first connection part of the seventh metal connection structure MN2 is electrically connected to the source electrode TNS of the output control transistor through a via-hole, and a second connection part of the seventh metal connection structure MN2 is electrically connected to an eighth metal connection structure MN3 provided in the second source-drain metal layer SD2 through a via-hole. The eighth metal connection structure MN3 is electrically connected to the sense signal line SSL. In this way, the signal generated by the photodetector OPD may be forwarded to the corresponding sense signal line SSL through the channel region TNAct of the output control transistor. In the circuit arrangement area PDCA corresponding to the driving circuit row HPDC in which the composite driving circuit XDC is not provided, the driving power line VDDL is also electrically connected through a via-hole to the power row line EMLC provided in the third gate layer GT3.

Figure 20:
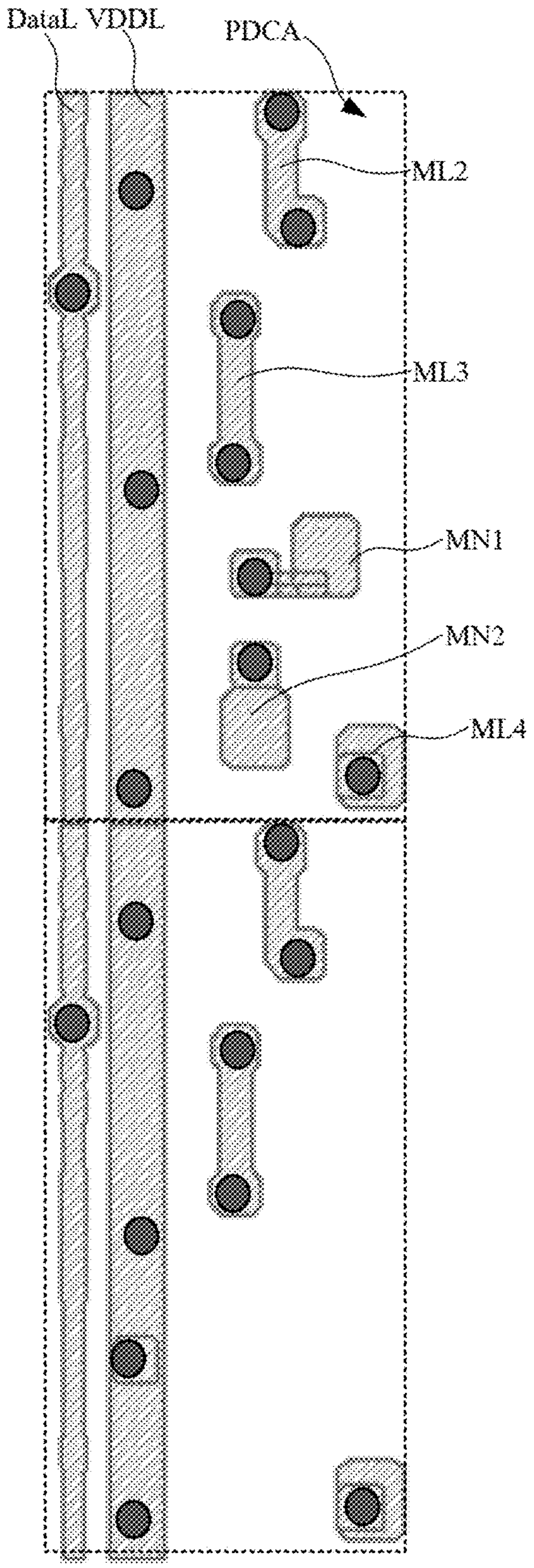
FIG. 20 is a schematic diagram of a structure of a first source-drain metal layer in the second example of the present disclosure.

FIG. 20 is a schematic diagram of a structure of the first source-drain metal layer SD1 of the display panel PNL in the second example. The circle filled with black indicates the position of a via-hole where the first source-drain metal layer SD1 is connected through the via-hole to each film layer (the low-temperature polysilicon semiconductor layer SEMI1, the first gate layer GT1, the second gate layer GT2, the metal-oxide semiconductor layer SEMI2, the third gate layer GT3, and the like) under the first source-drain metal layer SD1. Referring to FIG. 20, in the second example, the first source-drain metal layer SD1 is provided with the data line DataL and the driving power line VDDL, and the second metal connection structure ML2, the third metal connection structure ML3 and the fourth metal connection structure ML4 are provided in each of the circuit arrangement areas PDCA. In the circuit arrangement area PDCA corresponding to the composite driving circuit XDC, the sixth metal connection structure MN1 and the seventh metal connection structure MN2 are further provided. The data line DataL is electrically connected to the source electrode T4S of the data writing transistor through a via-hole. The driving power line VDDL is electrically connected to the first metal connection structure ML1, the source electrode T5S of the second light-emitting control transistor, and the second electrode plate CP2 of the storage capacitor through via-holes. The second metal connection structure ML2 is electrically connected through via-holes to the initial voltage line VinitL and the source electrode TIS of the capacitance reset transistor respectively, and is further electrically connected through a via-hole to the source electrode T7S of the electrode reset transistor of the pixel driving circuit PDC in the previous row. The third metal connection structure ML3 is electrically connected to the drain electrode T1D of the capacitance reset transistor, and the drain electrode T2D of the threshold compensation transistor through via-holes. The fourth metal connection structure ML4 is electrically connected to the drain electrode T7D of the electrode reset transistor and the drain electrode T6D of the first light-emitting control transistor through via-holes. The fourth metal connection structure ML4 is further electrically connected through a via-hole to the fifth metal connection structure ML5 provided in the second source-drain metal layer SD2, and the fifth metal connection structure ML5 is electrically connected through a via-hole to the pixel electrode ANDA provided in the pixel electrode layer ANDL, thereby enabling the pixel driving circuit PDC in the circuit arrangement area PDCA to drive the light-emitting element DD. In the second example, the sixth metal connection structure MN1 has two connection parts, a first connection part of the sixth metal connection structure MN1 is electrically connected to the drain electrode TND of the output control transistor through a via-hole, and a second connection part of the sixth metal connection structure MN1 is electrically connected through a via-hole to the ninth metal connection structure MN4 provided in the second source-drain metal layer SD2. The ninth metal connection structure MN4 is electrically connected to the device electrode ANDB provided in the pixel electrode layer ANDL via the device line ANDBL. The seventh metal connection structure MN2 has two connection parts, a first connection part of the seventh metal connection structure MN2 is electrically connected to the source electrode TNS of the output control transistor through a via-hole, and a second connection part of the seventh metal connection structure MN2 is electrically connected to the eighth metal connection structure MN3 provided in the second source-drain metal layer SD2 through a via-hole. The eighth metal connection structure MN3 is electrically connected to the sense signal line SSL. In this way, the signal generated by the photodetector OPD may be forwarded to a corresponding sense signal line SSL through the channel region TNAct of the output control transistor. In the circuit arrangement area PDCA corresponding to the driving circuit row HPDC in which the composite driving circuit XDC is not provided, the driving power line VDDL is also electrically connected through a via-hole to the power row line EMLC provided in the third gate layer GT3.

Figure 21:
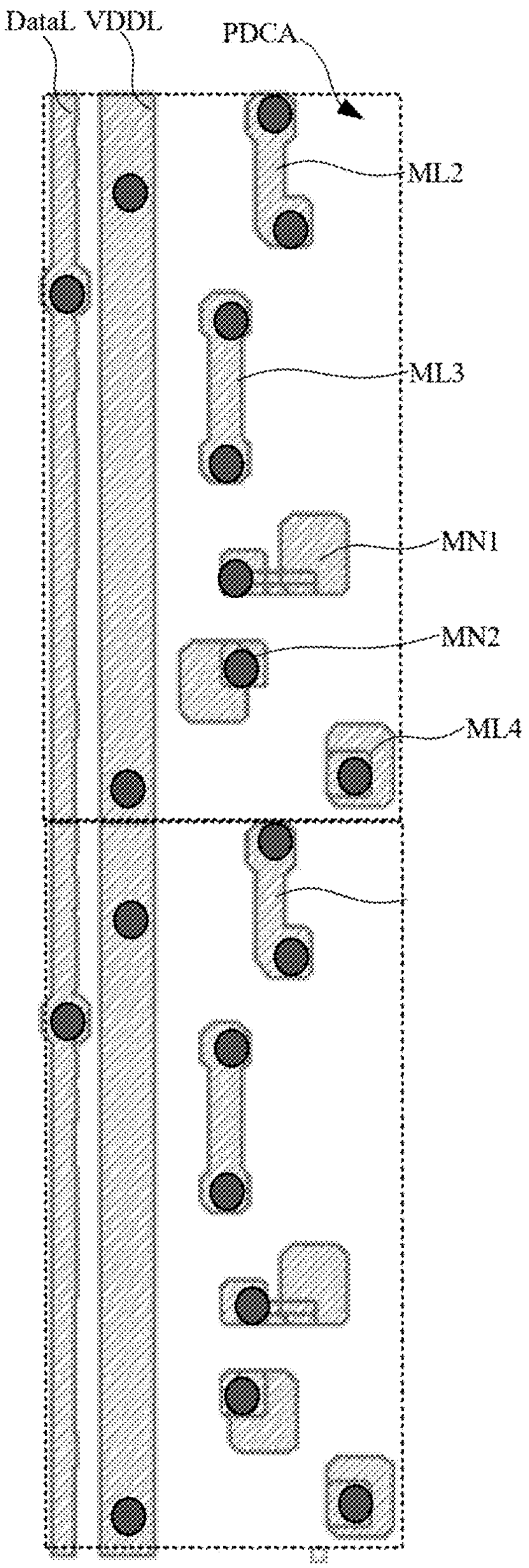
FIG. 21 is a schematic diagram of a structure of a first source-drain metal layer in the third example of the present disclosure.

FIG. 21 is a schematic diagram of a structure of the first source-drain metal layer SD1 of the display panel PNL in the third example. The circle filled with black indicates the position of a via-hole where the first source-drain metal layer SD1 is connected through the via-hole to each film layer (the low-temperature polysilicon semiconductor layer SEMI1, the first gate layer GT1, the second gate layer GT2, the metal-oxide semiconductor layer SEMI2, the third gate layer GT3, and the like) under the first source-drain metal layer SD1. The first source-drain metal layer SD1 of the display panel PNL in the third example is substantially the same as the first source-drain metal layer SD1 of the display panel PNL in the second example, except that the sixth metal connection structure MN1, the seventh metal connection structure MN2 and the like are provided in both of the adjacent circuit arrangement areas PDCA.

Figure 22:
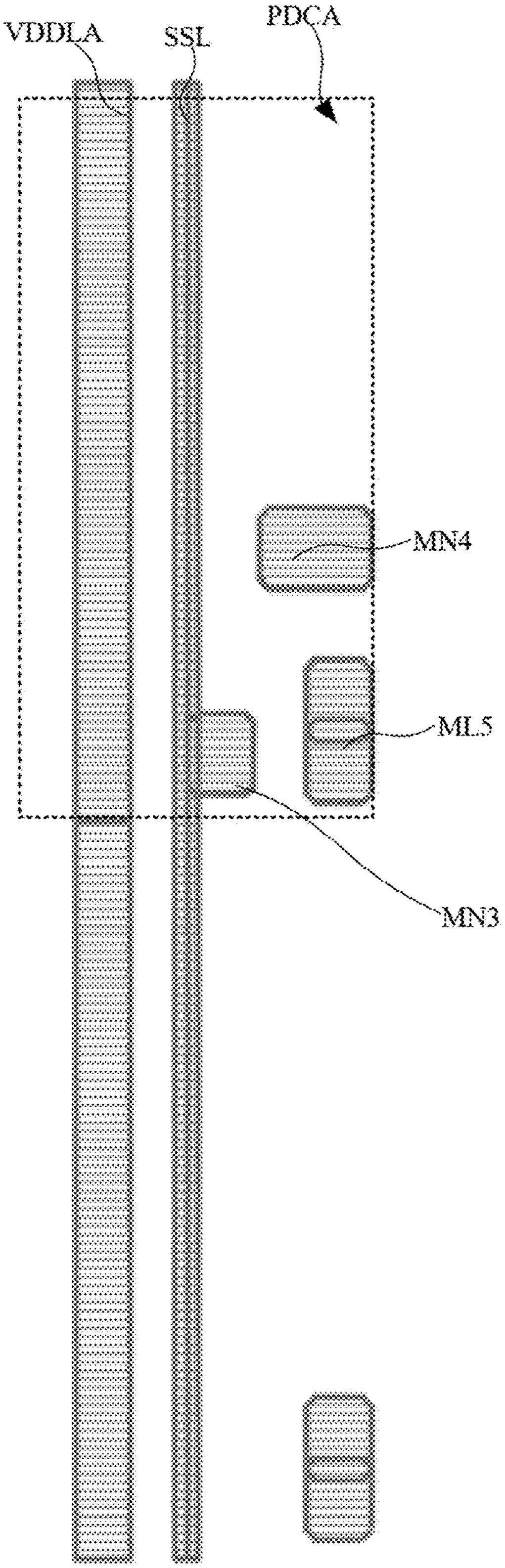
FIG. 22 is a schematic view of a structure of a second source-drain metal layer in the first example and second example of the present disclosure.

FIG. 22 is a schematic diagram of a structure of the second source-drain metal layer SD2 of the display panel PNL in the first example and the second example. The second source-drain metal layer SD2 is provided with the driving power auxiliary line VDDLA corresponding to the driving power line VDDL and the sense signal line SSL corresponding to the second driving circuit column VPDCB, the eighth metal connection structure MN3 and the ninth metal connection structure MN4 are provided in the circuit arrangement area PDCA corresponding to the composite driving circuit XDC, and the fifth metal connection structure ML5 is provided in each of the circuit arrangement areas PDCA. The driving power auxiliary line VDDLA is electrically connected to the driving power line VDDL, for example, through a via-hole in each of the circuit arrangement areas PDCA, which may reduce an impedance of the driving power line VDDL and improve the homogeneity of the driving power VDD. The eighth metal connection structure MN3 is electrically connected to the sense signal line SSL, and the ninth metal connection structure MN4 is electrically connected to the seventh metal connection structure MN2 provided in the first source-drain metal layer SD1, so that the photodetector OPD connected to the ninth metal connection structure MN4 can be connected to the sense signal line SSL via the output control transistor TN. The fifth metal connection structure ML5 is electrically connected to the fourth metal connection structure ML4 provided in the first source-drain metal layer SD1 and the light-emitting element DD, so that the pixel driving circuit PDC can drive the light-emitting element DD.

Figure 23:
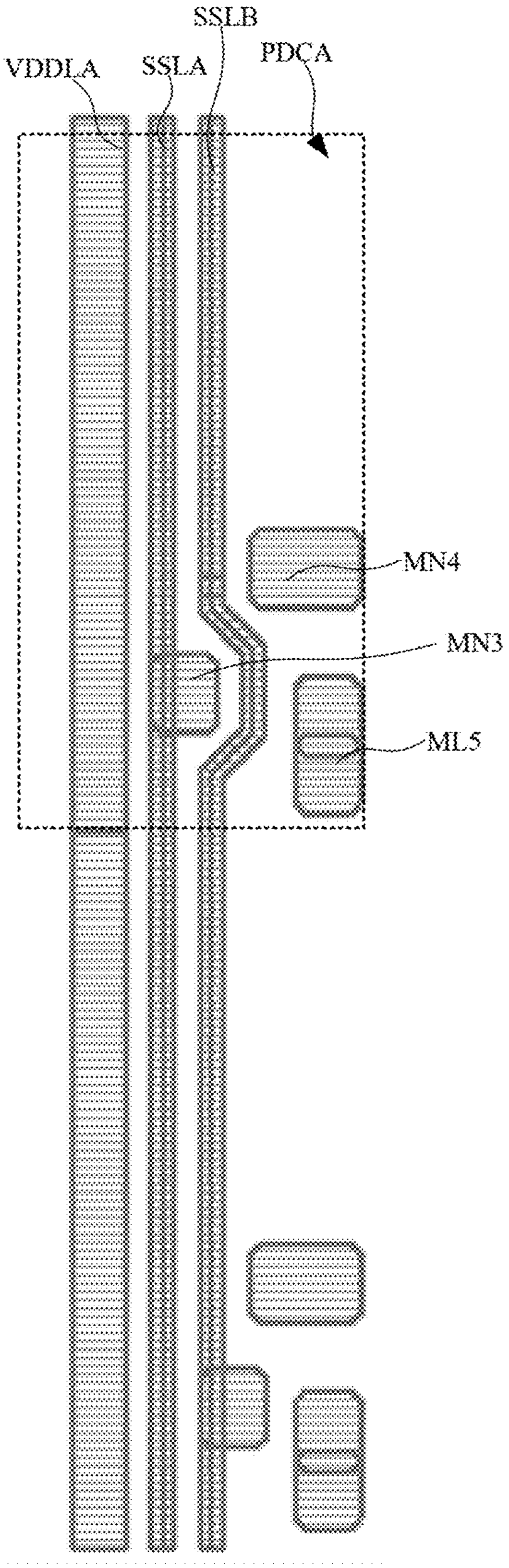
FIG. 23 is a schematic diagram of a structure of a second source-drain metal layer in the third example of the present disclosure.

FIG. 23 is a schematic diagram of a structure of the second source-drain metal layer SD2 of the display panel PNL in the third example. The structure of the second source-drain metal layer SD2 in the third example is similar to that in the first example and the second example, except that two sense signal lines SSL are provided in the area corresponding to the second driving circuit column VPDCB to be respectively connected to two adjacent composite driving circuits XDC in the same column. Correspondingly, the eighth metal connection structure MN3 and the ninth metal connection structure MN4 are provided in each of the circuit arrangement areas PDCA respectively corresponding to the two adjacent composite driving circuits XDC in the same row, and the eighth metal connection structure MN3 is electrically connected to the corresponding sense signal line SSL.

Figure 24:
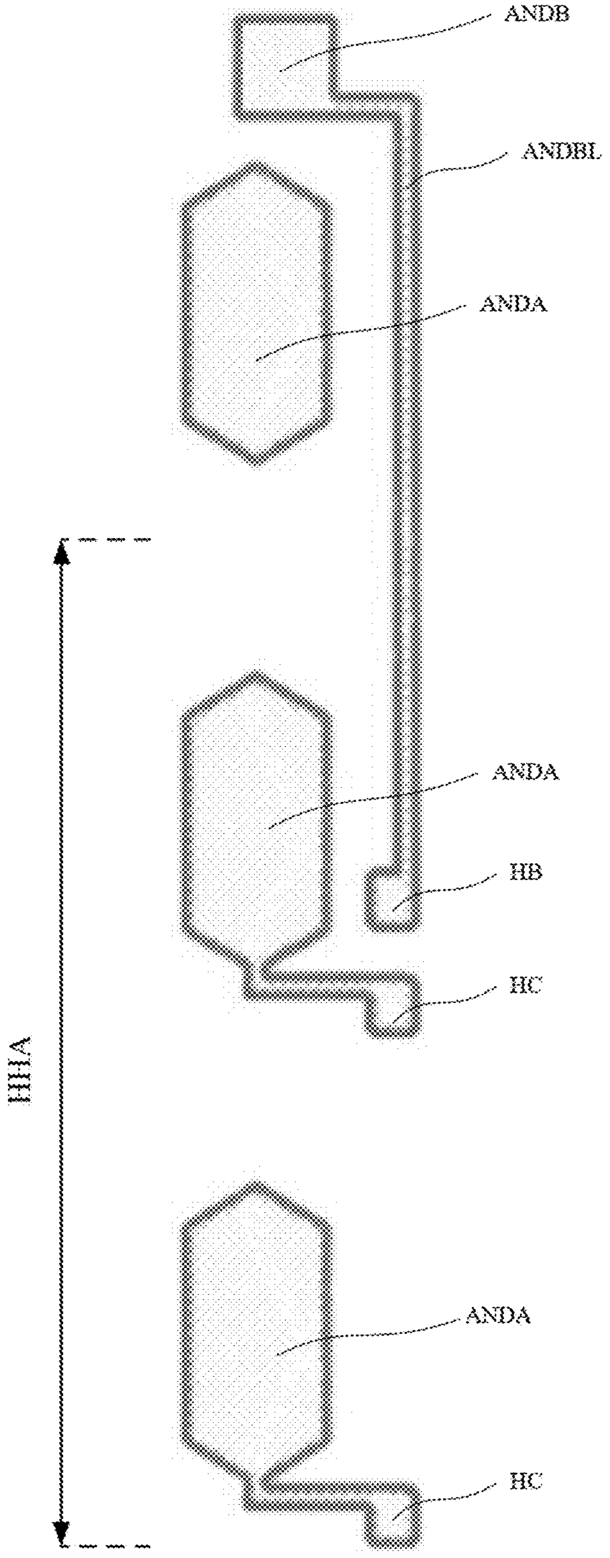
FIG. 24 is a schematic diagram of a structure of a pixel electrode layer in the first example and second example of the present disclosure.

FIG. 24 is a schematic diagram of a structure of the pixel electrode layer ANDL of the display panel PNL in the first example and the second example.

The pixel electrode layer ANDL is provided with the pixel electrode ANDA, the device electrode ANDB, and the device line ANDBL. The pixel electrode ANDA is electrically connected at the terminal HC to the fifth metal connection structure ML5 of the second source-drain metal layer SD2 through a via-hole, so that the pixel driving circuit PDC can drive the light-emitting element DD. The device electrode ANDB is electrically connected through the device line ANDBL to the ninth metal connection structure MN4 provided in the second source-drain metal layer SD2, so that the optical detection driving circuit MDC can drive the photodetector OPD. Referring to FIG. 24, the end HB of the device line ANDBL away from the device electrode ANDB is provided in a different row partition HHA from the device electrode ANDB, so that the optical detection driving circuit MDC and the photodetector OPD driven by the composite driving circuit XDC are provided in different row partitions HHA, respectively.

Figure 25:
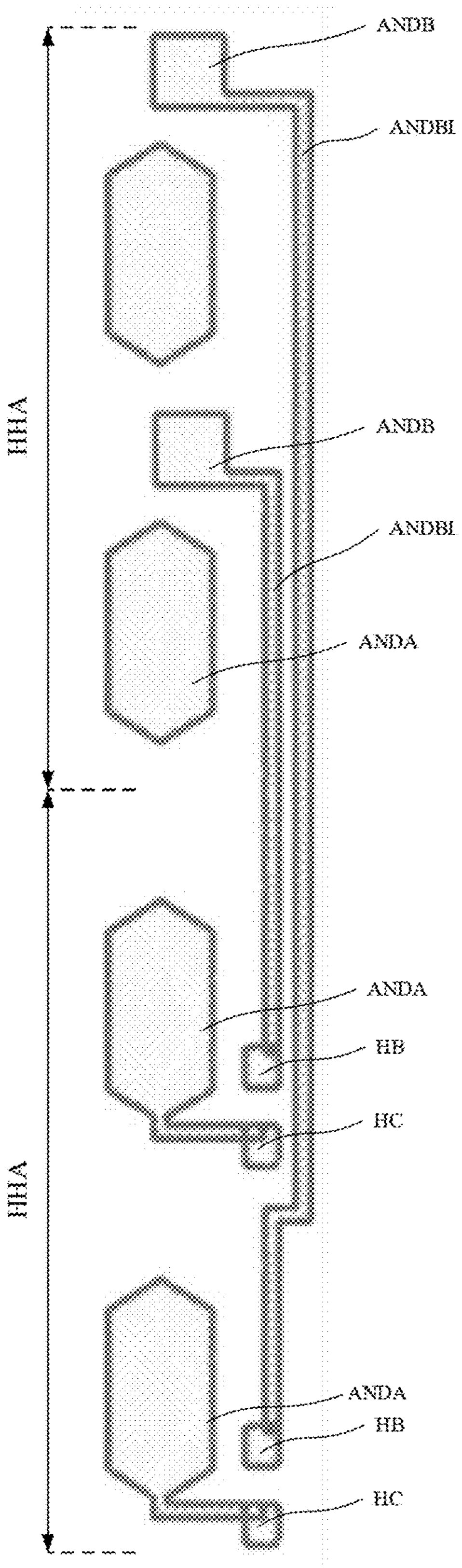
FIG. 25 is a schematic diagram of a structure of a pixel electrode layer in the third example of the present disclosure.

FIG. 25 is a schematic diagram of a structure of the pixel electrode layer ANDL of the display panel PNL in the third example. The pixel electrode layer ANDL is provided with the pixel electrode ANDA, the device electrode ANDB, and the device line ANDBL. The pixel electrode ANDA is electrically connected through a via-hole to the fifth metal connection structure ML5 of the second source-drain metal layer SD2, so that the pixel driving circuit PDC can drive the light-emitting element DD. The device electrode ANDB is electrically connected through the device line ANDBL to the ninth metal connection structure MN4 provided in the second source-drain metal layer SD2, so that the optical detection driving circuit MDC can drive the photodetector OPD. Referring to FIG. 25, the photodetectors OPD driven by the two optical detection driving circuits MDC in the same column in the same row partition HHA are both provided in another adjacent row partition HHA; and both of the two device lines ANDBL are provided at the same side of the pixel electrode ANDA, so that the lengths of the two device lines ANDBL are different. Of course, the lengths of the two device lines ANDBL may be made the same by using a bridging connection structure or the like to improve the homogeneity of the photodetector OPD.

Those skilled in the art may easily conceive of other embodiments of the present disclosure upon consideration of the specification and practice of the invention disclosed herein. The present application is intended to cover any variations, uses, or adaptations of the present disclosure that follow the general principles of the present disclosure and include the common knowledge or the customary technical means in the art not disclosed herein. The specification and embodiments are to be regarded as exemplary only, and the true scope and spirit of the present disclosure is indicated by the claims.

What is claimed is:

1. A display panel comprising a plurality of composite driving circuits and comprising light-emitting elements and photodetectors driven by the composite driving circuits, the composite driving circuit comprising a first pixel driving circuit configured to drive the light-emitting element and an optical detection driving circuit configured to drive the photodetector, wherein the first pixel driving circuit comprises a driving transistor and a first light-emitting control transistor, the driving transistor is configured to output a driving current for driving the light-emitting element under control of a voltage on a gate electrode of the driving transistor and the driving transistor is electrically connected to a pixel electrode of the light-emitting element through the first light-emitting control transistor, the optical detection driving circuit comprises an output control transistor, and a device electrode of the photodetector is electrically connected to a sense signal line through the output control transistor, the display panel comprises a plurality of row partitions sequentially arranged in a column direction, and each of the plurality of row partitions is provided with an enable signal line group to be applied with a same enable signal, and at least one of the plurality of row partitions is provided with the composite driving circuit, a gate electrode of the output control transistor and a gate electrode of the first light-emitting control transistor of the composite driving circuit are electrically connected to the enable signal line group, one of the first light-emitting control transistor and the output control transistor is configured to be turned on in response to a high level signal of the enable signal, and the other one of the first light-emitting control transistor and the output control transistor is configured to be turned on in response to a low level signal of the enable signal, and the composite driving circuit and the photodetector driven by the composite driving circuit are provided in different row partitions respectively.

2. The display panel according to claim 1, wherein the composite driving circuit and the photodetector driven by the composite driving circuit are provided in two adjacent row partitions respectively.

3. The display panel according to claim 1, wherein the driving transistor and the first light-emitting control transistor are P-type transistors, and the output control transistor is a metal-oxide semiconductor transistor.

4. The display panel according to claim 1, wherein the first pixel driving circuit further comprises a storage capacitor and a data writing transistor, the gate electrode of the driving transistor is electrically connected to the storage capacitor so that the driving transistor outputs the driving current for driving the light-emitting element under the control of the voltage on the gate electrode of the driving transistor, and the data writing transistor is configured to write driving data into the storage capacitor.

5. The display panel according to claim 4, wherein the first pixel driving circuit further comprises a capacitance reset transistor, a threshold compensation transistor, a second light-emitting control transistor and an electrode reset transistor, wherein a source electrode of the capacitance reset transistor is configured to be applied with a first initial voltage, a drain electrode of the capacitance reset transistor is electrically connected to a first node, and a gate electrode of the capacitance reset transistor is configured to be applied with a first reset signal, a source electrode of the threshold compensation transistor is electrically connected to a third node, a drain electrode of the threshold compensation transistor is electrically connected to the first node, and a gate electrode of the threshold compensation transistor is configured to be applied with a scanning signal, a source electrode of the driving transistor is electrically connected to a second node, a drain electrode of the driving transistor is electrically connected to the third node, and the gate electrode of the driving transistor is electrically connected to the first node, a source electrode of the data writing transistor is configured to be applied with the driving data, a drain electrode of the data writing transistor is electrically connected to the second node, and a gate electrode of the data writing transistor is configured to be applied with the scanning signal, a source electrode of the second light-emitting control transistor is configured to be applied with driving power, a drain electrode of the second light-emitting control transistor is electrically connected to the second node, and a gate electrode of the second light-emitting control transistor is configured to be applied with a same enable signal as a gate electrode of the first light-emitting control transistor, a source electrode of the first light-emitting control transistor is electrically connected to the third node, and a drain electrode of the first light-emitting control transistor is electrically connected to the pixel electrode of the light-emitting element, and a source electrode of the electrode reset transistor is configured to be applied with a second initial voltage, a drain electrode of the electrode reset transistor is electrically connected to the drain electrode of the first light-emitting control transistor, and a gate electrode of the electrode reset transistor is configured to be applied with a second reset signal.

6. The display panel according to claim 1, wherein the display panel comprises a base substrate, a driving layer and a device layer stacked sequentially, and the first pixel driving circuit and the optical detection driving circuit are provided in the driving layer, and the light-emitting element and the photodetector are provided in the device layer.

7. The display panel according to claim 6, wherein in the row partition provided with the composite driving circuit, the enable signal line group comprises at least one first enable signal line and at least one second enable signal line, the gate electrode of each first light-emitting control transistor in the row partition is electrically connected to the first enable signal line, and the gate electrode of the output control transistor in the row partition is electrically connected to the second enable signal line.

8. The display panel according to claim 7, wherein the display panel comprises a display area and a peripheral area surrounding the display area, and the composite driving circuit is provided in the display area, the first enable signal line and the second enable signal line extend through the display area in a row direction, and ends of the first enable signal line and the second enable signal line in a same enable signal line group are electrically connected in the peripheral area.

9. The display panel according to claim 6, wherein the device layer comprises a pixel electrode layer, a pixel defining layer, a composite functional material layer, and a common electrode layer sequentially stacked and arranged on a side of the driving layer away from the base substrate, and the composite functional material layer comprises a photoelectric conversion material layer and an electroluminescent material layer, the pixel electrode layer comprises the pixel electrode of the light-emitting element, the device electrode of the photodetector and a device line, and the device electrode of the photodetector is electrically connected, through the device line, to the optical detection driving circuit for driving the photodetector.

10. The display panel according to claim 1, wherein in the composite driving circuit, a wiring area of the optical detection driving circuit is provided within a wiring area of the first pixel driving circuit.

11. The display panel according to claim 1, wherein the display panel further comprises second pixel driving circuits and light-emitting elements driven by the second pixel driving circuits.

12. The display panel according to claim 11, wherein the composite driving circuits and the second pixel driving circuits are arranged in a plurality of driving circuit rows, and any one of the row partitions comprises one or more of the driving circuit rows.

13. The display panel according to claim 12, wherein in any one of the row partitions, at most one of the driving circuit rows is provided with the composite driving circuit, the composite driving circuits and the second pixel driving circuits are arranged in a plurality of driving circuit columns, and respective optical detection driving circuits provided in a same driving circuit column are electrically connected to a same sense signal line.

14. The display panel according to claim 12, wherein the composite driving circuits and the second pixel driving circuits are arranged in a plurality of driving circuit columns, and the composite driving circuits in at least one of the driving circuit columns are provided in a same row partition, and the composite driving circuits provided in the same row partition and in a same driving circuit column are connected to different sense signal lines respectively.

15. The display panel according to claim 11, wherein the composite driving circuits and the second pixel driving circuits are arranged in a plurality of driving circuit columns, the display panel comprises driving power lines respectively corresponding to respective driving circuit columns, each of the first pixel driving circuit and the second pixel driving circuit in the driving circuit column is electrically connected to a corresponding driving power line, the display panel is further provided with a power row line provided in a same layer as the enable signal line group, and the power row line extends in a row direction and is electrically connected to each of the driving power lines.

16. The display panel according to claim 11, wherein the first pixel driving circuit is the same as the second pixel driving circuit.

* * * * *